United States Patent
Nanno

(10) Patent No.: US 7,998,620 B2
(45) Date of Patent: Aug. 16, 2011

(54) POSITIVE ELECTRODE ACTIVE MATERIAL FOR NON-AQUEOUS ELECTROLYTE SECONDARY BATTERY AND METHOD FOR PRODUCING THE SAME, AND NON-AQUEOUS ELECTROLYTE SECONDARY BATTERY USING POSITIVE ELECTRODE ACTIVE MATERIAL

(75) Inventor: Tetsuo Nanno, Osaka (JP)

(73) Assignee: Panasonic Corporation, Osaka (JP)

( * ) Notice: Subject to any disclaimer, the term of this patent is extended or adjusted under 35 U.S.C. 154(b) by 931 days.

(21) Appl. No.: 11/943,651

(22) Filed: Nov. 21, 2007

(65) Prior Publication Data

US 2008/0118829 A1 May 22, 2008

(30) Foreign Application Priority Data

Nov. 22, 2006 (JP) ................................. 2006-316185
Dec. 6, 2006 (JP) ................................. 2006-329798

(51) Int. Cl.
*H01M 4/58* (2010.01)
(52) U.S. Cl. ............. 429/231.1; 429/231.9; 429/231.95; 429/218.1; 429/163; 252/182.1
(58) Field of Classification Search ............... 429/231.1, 429/231.3, 231.5, 231.6, 224, 223, 231.9, 429/231.95, 218.1, 163; 252/182.1
See application file for complete search history.

(56) References Cited

U.S. PATENT DOCUMENTS 6,348,284 B1 * 2/2002 Bernard et al. ............... 429/223

FOREIGN PATENT DOCUMENTS

| CN | 1719639 | 1/2006 |
|---|---|---|
| JP | 7-105950 | 4/1995 |
| JP | 2000-203844 | 7/2000 |

OTHER PUBLICATIONS

Chinese Office Action, with English translation, issued in Chinese Patent Application No. 200710186473.5, mailed Jun. 8, 2010.
Arai, et al., "Characterization and cathode performance of $Li_{1-x}Ni_{1+x}O_2$ prepared with the excess lithium method," Solid State Ionics, vol. 80, 1995, pp. 261-269.
Kang, et al., "Electrodes with High Power and High Capacity for Rechargeable Lithium Batteries," Science AAAs, Feb. 17, 2006.
Kang, et al., "Electrodes with High Power and High Capacity for Rechargeable Lithium Batteries," Science AAAs, Feb. 17, 2006, Supporting Online Material.

* cited by examiner

*Primary Examiner* — Laura Weiner
(74) *Attorney, Agent, or Firm* — McDermott Will & Emery LLP

(57) ABSTRACT

An object of the present invention is to provide a positive electrode active material for a non-aqueous electrolyte secondary battery, which can solve the problem that the capacity remarkably decreases with an increase of the number of charging and discharging cycles in a high capacity non-aqueous electrolyte secondary battery using a positive electrode active material for a non-aqueous electrolyte secondary battery made of particles of an alkali metal composite oxide containing nickel.

A positive electrode active material for a non-aqueous electrolyte secondary battery, comprising a nickel-alkali metal-containing composite oxide having cracks on the surface of primary particles is used.

3 Claims, 6 Drawing Sheets

POSITIVE ELECTRODE ACTIVE MATERIAL FOR NON-AQUEOUS ELECTROLYTE SECONDARY BATTERY AND METHOD FOR PRODUCING THE SAME, AND NON-AQUEOUS ELECTROLYTE SECONDARY BATTERY USING POSITIVE ELECTRODE ACTIVE MATERIAL

BACKGROUND OF THE INVENTION

1. Field of the Invention

The present invention relates to a positive electrode active material for a non-aqueous electrolyte secondary battery and a method for producing the same, and a non-aqueous electrolyte secondary battery using the positive electrode active material.

2. Description of the Related Art

As a main power supply and a backup power supply of miniaturized electronic equipments, a secondary battery having a high energy density is required. A lithium ion secondary battery is preferably used in applications described above because it has a high voltage and a high energy density. In particular, advances have been made in research and development of a high energy density lithium ion secondary battery using a lithium nickel composite oxide such as $LiNiO_2$ as a positive electrode active material.

Solid State Ionics Vol. 80 (1995) (Non-Patent Document 1) discloses a lithium nickel composite oxide $Li_{1-x}Ni_{1+x}O_2$ obtained by wet-mixing $LiOH.H_2O$ and $Ni(NO_3)_2.6H_2O$ and sintering the mixture in air. In case of $Li_{1-x}Ni_{1+x}O_2$, an amount x of nickel excessively exists at the occupying position of lithium. It is reported that the discharge capacity increases as the value of x decreases. Also, it is disclosed that a secondary battery using $Li_{1-x}Ni_{1+x}O_2$ as the positive electrode active material has a discharge capacity of 220 mAh/g upon first discharging based on a $Li/Li^+$ electrode when charged or discharged within a range from 3.0 to 4.5 V. It is also disclosed that the charge and discharge capacity of the secondary battery decreases to 200 mAh/g only by repeating charging and discharging about 10 times.

Also, Japanese Unexamined Patent Publication (Kokai) No. 7-105950 (Patent Document 1) discloses that it has hitherto been difficult to obtain a secondary battery having a high discharge capacity with good reproducibility when $LiNiO_2$ is used. It is also discloses that a secondary battery having a high discharge capacity can be obtained with good reproducibility by using a positive electrode active material made of $LiNiO_2$ particles in which primary particles capable of forming aggregated particles like secondary particles have a particle size of 1 μm or less. The patent document discloses, as a method for producing the positive electrode active material, a method of mixing lithium carbonate with nickel oxide and heat-treating the mixture.

In both lithium nickel composite oxides described in Non-Patent Document 1 and Patent Document 1, nickel exists at the occupying position of lithium. Therefore, there is a problem that the charge and discharge capacity decreases because of excess nickel.

As the positive electrode active material obtained as a result of a solution of the above problem, for example, $LiNi_{0.5}Mn_{0.5}O_2$ obtained by the method disclosed in "Science Vol. 311 (2006) page 977" (Non-Patent Document 2) and "Electrodes with High Power and High Capacity for Rechargeable Lithium Batteries, Kisuk Kang and four others, "On line Science Homepage, Internet URL: http://www-.sciencemag.org/cgi/content/full/311/5763/977/DC1 searched on Sep. 11, 2006" (Non-Patent Document 3) is known. The method is as follows.

First, $NaNi_{0.5}Mn_{0.5}O_2$ is synthesized by wet grinding and mixing $Na_2CO_3$, $Ni(OH)_2$ and $Mn_2O_3$ in a ball mill for one day and reacting the mixture in air at 900° C. for 24 hours. Then, $NaNi_{0.5}Mn_{0.5}O_2$ is reacted in a molten salt composed of a 10-fold amount of $LiNO_3$ and LiCl, thereby ion-exchanging sodium in $NaNi_{0.5}Mn_{0.5}O_2$ with lithium to obtain $LiNi_{0.5}Mn_{0.5}O_2$.

In $LiNi_{0.5}Mn_{0.5}O_2$ obtained by the above method, since exchange of the occupying position of lithium with that of nickel is suppressed, a decrease in the charge and discharge capacity caused by the presence of excess nickel at the occupying position of lithium can be suppressed. It is also discloses that a secondary battery using the resulting $LiNi_{0.5}Mn_{0.5}O_2$ as a positive electrode active material attains a capacity of more than 200 mAh/g based on a $Li/Li^+$ electrode when charged and discharged within a range from 3.0 to 4.6 V.

However, particles of the positive electrode active material $LiNi_{0.5}Mn_{0.5}O_2$ described in the aforementioned Non-Patent Documents 2 and 3 have a problem that the capacity remarkably decreases with an increase of the number of charging and discharging cycles. Specifically, it is described that the capacity decreases to about 80% of the initial capacity after 30 charging and discharging cycles.

SUMMARY OF THE INVENTION

An object of the present invention is to provide a positive electrode active material composed of alkali metal composite oxide particles containing nickel, which is used to obtain a non-aqueous electrolyte secondary battery having excellent lifetime characteristics and high capacity in which the capacity does not remarkably decrease even if the number of charging and discharging cycles increases.

One aspect of the present invention pertains to a positive electrode active material for a non-aqueous electrolyte secondary battery, comprising a nickel-alkali metal-containing composite oxide having cracks on the surface of primary particles.

Another aspect of the present invention pertains to a method for producing a positive electrode active material for a non-aqueous electrolyte secondary battery, which comprises a step of performing an ion-exchange reaction of sodium and lithium by mixing a nickel-sodium-containing composite oxide whose primary particles has an average particle size of from 1 to 50 μm with a molten salt containing lithium.

Still another aspect of the present invention pertains to a non-aqueous electrolyte secondary battery comprising a battery case, and an electrode plate group and a non-aqueous electrolyte, which are sealed into the battery case, the electrode plate group including a positive electrode plate containing the positive electrode active material and a negative electrode plate, which face each other with a separator being interposed therebetween.

Objects, features, aspects and advantages of the present invention become more apparent from the following detailed description and accompanying drawings.

DETAILED DESCRIPTION OF THE INVENTION

Figure 1:
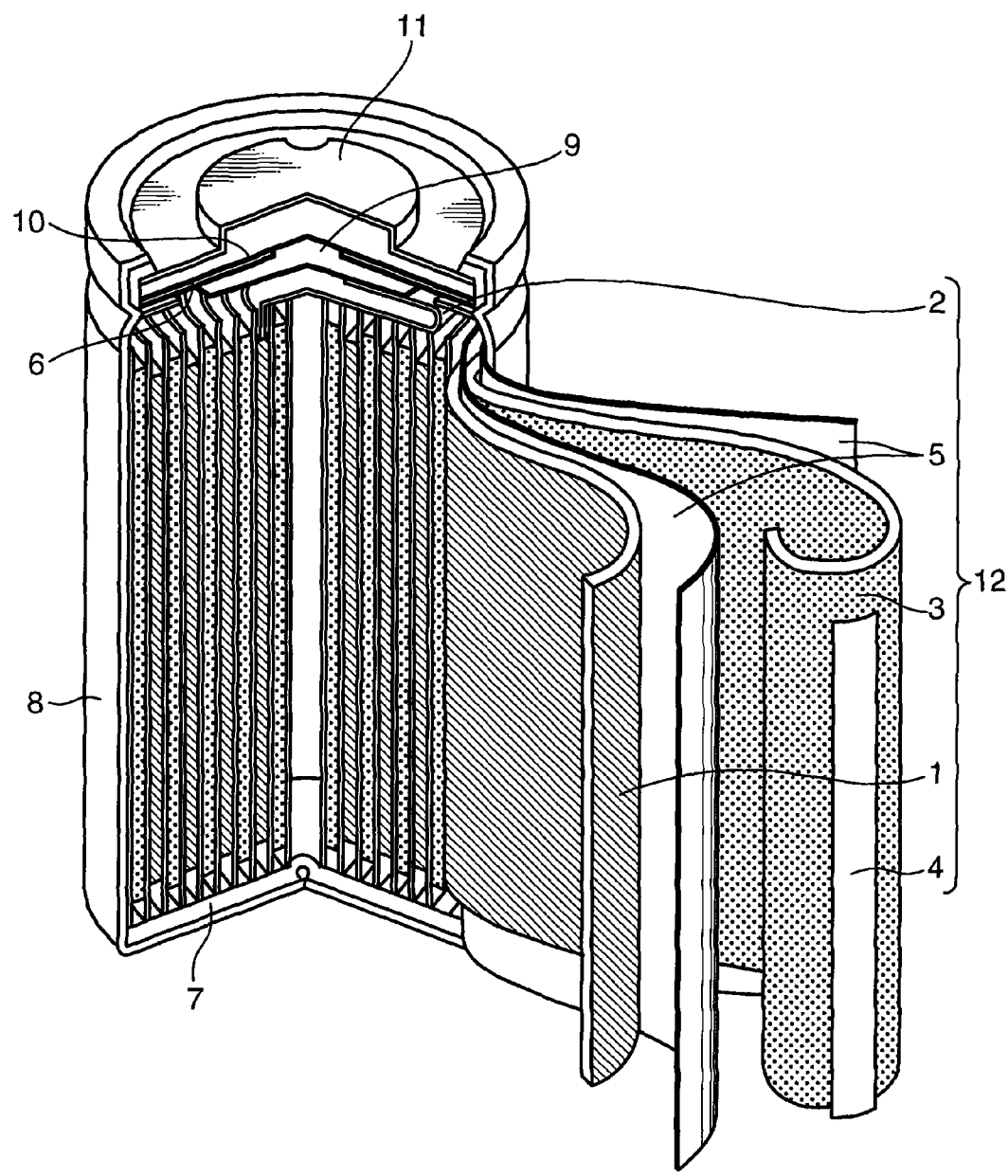
FIG. 1 is a schematic sectional view showing one example of a non-aqueous electrolyte secondary battery of the present embodiment.

The positive electrode active material for a non-aqueous electrolyte secondary battery according to one embodiment of the present invention comprises a nickel-alkali metal-containing composite oxide having cracks on the surface of primary particles.

As a result of intensive study, the present inventors have concluded that the reason of a remarkable decrease in the capacity of a non-aqueous electrolyte secondary battery involved in an increase in the number of charging and discharging cycles is as follows. Namely, when a positive electrode active material expands and shrinks upon charging and discharging, a positive electrode mix comprising a positive electrode active material, a conductor and a binder applied on a positive electrode current collector expands and swells with an electrolytic solution, resulting in deterioration of electrical adhesion between the positive electrode active materials. Namely, when lithium is extracted from the positive electrode active material upon discharging, adjacent oxygens electrically repel each other and the entire particles expand. When lithium is inserted into the positive electrode active material upon charging, the entire particles become electrically stable and shrink. Therefore, when the charging and discharging cycle is repeated, the entire particles repeatedly expand and shrink, and thus the positive electrode mix on the positive electrode current collector gradually expands, resulting in deterioration of adhesion between the positive electrode active materials. Therefore, a remarkable decrease in the capacity involved in an increase in the number of charging and discharging cycles can be suppressed by suppressing volume variation of particles of the positive electrode active material upon charging and discharging.

As a result of the above study, the present inventors have concluded that expansion and shrinkage of the entire particles of the positive electrode active material can be suppressed by relieving volume variation of the positive electrode active material upon charging and discharging through cracks formed on the positive electrode active material.

There are no restrictions on the nickel-alkali metal-containing composite oxide in the present embodiment provided that it is a metal composite oxide containing nickel and an alkali metal in the composition.

For example, it is preferred to use a nickel lithium-containing composite oxide represented by the general formula (2):

$$Li_{w-x}Na_xNi_{1-y-z}Mn_yMe_zO_2 \qquad (2)$$

wherein, in the formula (2), w satisfies the following relation: $0.9 \leq w \leq 1.1$, x satisfies the following relation: $0 \leq x \leq 0.15$, y satisfies the following relation: $0 \leq y \leq 0.7$, z satisfies the following relation: $0 \leq z \leq 0.4$, and Me represents at least one kind of element selected from the group consisting of Co, Fe, Cu, Al, Mg, Ti, Zr, Ce and Y.

In the general formula (2), the value of x, which represents the proportion of sodium, preferably satisfies the following relation: $0 \leq x \leq 0.15$, and more preferably the following relation: $0 \leq x \leq 0.05$. Even if x=0, namely, sodium is not contained, the nickel lithium-containing composite oxide electrochemically acts as a positive electrode active material. In contrast, when the value of x is too large, sodium ions are extracted from the positive electrode upon charging and the extracted sodium is stored in the negative electrode, and thus a compound having high reactivity with an electrolytic solution is sometimes produced on the negative electrode. This compound reacts with the electrolytic solution upon charging and discharging to produce a by-product. The capacity of the secondary battery tends to decrease by production of the by-product.

Also, the value of y, which represents the proportion of manganese, preferably satisfies the following relation: $0 \leq y \leq 0.7$, and more preferably the following relation: $0 \leq y \leq 0.34$. Cost of the active material can be reduced by containing manganese. Even if y=0, namely, manganese is not contained, the nickel lithium-containing composite oxide electrochemically acts as a positive electrode active material. In contrast, when the value of y is too large, it becomes less likely to form cracks on the surface of particles. The detailed reason is unclear but is considered as follows. Namely, when the value of y exceeds 0.34, primary particles of the nickel-alkali metal-containing composite oxide do not sufficiently grow and a large number of grain boundaries are formed in the resulting primary particles. The grain boundary relieves distortion in the particles, thus cracks are less likely to occur, particularly, when the primary particles have a small particle size.

Also, Me represents at least one kind of element selected from the group consisting of Co, Fe, Cu, Al, Mg, Ti, Zr, Ce and Y, and the value of z which represents the proportion thereof preferably satisfies the following relation: $0 \leq z \leq 0.4$, and more preferably the relation: $0 \leq z \leq 0.34$. When the element is contained in the proportion within the above ranges, crystal system variation of the active material caused by charging and discharging is suppressed and lifetime characteristics of the charging and discharging cycle are more improved. Even if the value of z is 0, the nickel lithium-containing composite oxide electrochemically acts as a positive electrode active material. In contrast, when the value of z is too large, the charge and discharge capacity of the positive electrode active material tends to decrease.

The value of w which represents the total amount of the alkali metal preferably satisfies the following relation: $0.9 \leq w \leq 1.1$. The value of w is not preferably less than 0.9 and more than 1.1 because the charge and discharge capacity of the active material decreases.

There are no restrictions on the shape of cracks existing on the surface of primary particles of the nickel-alkali metal-containing composite oxide, and the width of cracks is preferably from 0.005 to 0.2 µm, and more preferably from 0.01 to 0.1 µm. When the width of cracks is too small, it is impossible to sufficiently absorb volume variation of particles. In contrast, when the width of cracks is too large, the filling amount of the active material per volume of the positive electrode plate and thus the energy density of the battery tend to decrease.

The distance between cracks existing on the surface of primary particles is preferably from 0.01 to 1 µm, and more preferably from 0.05 to 0.5 µm. When the distance between cracks is too large, since the proportion of cracks absorbing volume variation to volume variation of particles is too small, it tends to be impossible to sufficiently absorb volume variation. In contrast, when the distance between cracks is too small, the filling amount of an active material per volume of the positive electrode plate decreases and thus the energy density of the battery tends to decrease.

It is preferred that the nickel-alkali metal-containing composite oxide exist as primary particles without being substantially converted into secondary particles, namely, without forming secondary particles. The average particle size of primary particles is preferably 0.1 µm or more, and more preferably 1 µm or more. When the average particle size is too small, primary particles are likely to be aggregated to form secondary particles and thus the active material filling density of the electrode plate tends to decrease. When the nickel-alkali metal-containing composite oxide exists as primary particles, lubricity between the positive electrode active materials is good in the production of the positive electrode plate and the filling amount of the active material per unit volume can increase. Also, the average particle size of primary particles is preferably 50 µm or less, and more preferably 30 µm or less. When the average particle size is too large, adhesion between the positive electrode active materials becomes inferior and thus a high capacity may not be obtained or it may become difficult to control the thickness of the electrode plate.

The average particle size of primary particles or secondary particles in the present invention is a number average particle size measured by a scanning electron microscope (SEM). Specifically, a portion of powders were samples and a SEM micrograph was taken. Particles, which are judged as primary particles or secondary particles while viewing the micrographs, were samples at random and then an average of the resulting average particle size was determined. With respect to long and thin particles, an average of length and width was adopted as the particle size.

A method for producing a nickel-alkali metal-containing composite oxide having cracks on the surface of primary particles will now be described in detail.

The method for forming cracks on the surface of primary particles includes, for example, a method of substituting sodium of a composite oxide whose primary particles have an average particle size of 0.1 to 50 µm, which contains nickel and sodium (hereinafter also referred to as a nickel-sodium-containing composite oxide) with lithium.

According to this method, in the case of substituting sodium in the nickel-sodium-containing composite oxide with lithium, shrinkage of the particles is caused by a difference in an ionic radius between sodium and lithium, and then, cracks are formed on the surface of primary particles so as to relieve distortion generated by shrinkage.

Specifically, when particles of $NaNiO_2$ are reacted with a molten salt containing lithium to obtain $LiNiO_2$, the lattice volume per formula weight of $NaNiO_2$ is 39.58 Å$^3$, whereas, the lattice volume per formula weight of $LiNiO_2$ is 33.89 Å$^3$. Therefore, the lattice volume shrinks by 0.856 times and the lattice diameter shrinks by 0.949 times by substituting sodium with lithium. When the average particle size of primary particles is from 0.1 to 50 µm, since distortion in the particles increases to some extent, cracks are formed on the surface of primary particles so as to relieve volume shrinkage.

The nickel-sodium-containing composite oxide is used without any restriction provided that it is a composite oxide containing nickel and sodium. For example, it is preferred to use a nickel-sodium-containing composite oxide represented by the general formula (3):

$$Li_{s-p}Na_pNi_{1-q-r}Mn_qMe_rO_2 \qquad (3)$$

wherein, in the formula (3), S satisfies the following relation: $0.9 \leq S \leq 1.1$, p satisfies the following relation: $0.6 \leq p \leq 1$, q satisfies the following relation: $0 \leq q \leq 0.7$, r satisfies the following relation: $0 \leq r \leq 0.4$, and Me represents at least one kind of element selected from the group consisting of Co, Fe, Cu, Al, Mg, Ti, Zr, Ce and Y.

In the formula (3), the value of p which represents the proportion of sodium preferably satisfies the following relation: $0.6 \leq p \leq 1$, and more preferably the relation: $0.8 \leq p \leq 1$. When the value of p is too small, shrinkage occurring in case of substituting sodium with lithium decreases and thus cracks are less likely to form on the surface of particles.

With respect to the particle size of the nickel-sodium-containing composite oxide, the average particle size of primary particles is from 0.1 to 50 µm, and preferably from 1 to 50 µm. When the average particle size is less than 0.1 µm, the particle size is too small and distortion occurring in the case of the ion-exchange reaction of Na and Li decreases, and thus sufficient cracks are not formed on the surface of particles. In contrast, when the particle size is more than 50 µm, the particle size is too large, and thus adhesion between the positive electrode active materials becomes inferior and a high capacity cannot be obtained.

The nickel-sodium-containing composite oxide whose primary particles have an average particle size of 0.1 to 50 µm can be obtained by mixing an oxygen-containing nickel compound such as a nickel-containing oxide or nickel-containing hydroxide having a secondary particle size of 0.1 to 50 µm with an alkali metal source containing sodium, and maintaining at a temperature of a melting point or higher of the alkali metal source for a predetermined time.

As used herein, the oxygen-containing nickel compound is NiO or $Ni(OH)_2$ and a composite oxide or composite hydroxide which contains nickel and a metallic element other than nickel. Specific examples of the metallic element other than nickel include metallic elements such as Mn, Co, Fe, Cu, Al, Mg, Ti, Zr, Ce and Y. These metallic elements may be contained alone or in combination. An oxygen-containing nickel compound containing a transition metal is particularly preferred in view of the fact that it is possible to obtain a nickel-sodium-containing composite oxide which easily causes grain growth and has a large crystallite, and also has a large average particle size of primary particles.

In the above method, an oxygen-containing nickel compound whose secondary particles have an average particle size of 0.1 to 50 µm, preferably 1 to 50 µm and an alkali metal source containing sodium are reacted at a temperature of the melting point or higher of the alkali metal source. A nickel-sodium-containing composite oxide is formed by the reaction. In this case, the oxygen-containing nickel compound is fired and the primary particles cause grain growth. The grain does not grow to a particle size more than the secondary particle size of the oxygen-containing nickel compound. Therefore, the particle size of primary particles thus formed is within a range from 0.1 to 50 μm at most, which is the range of the average particle size of secondary particles of the oxygen-containing nickel compound. When the average particle size of secondary particles of the oxygen-containing nickel compound is too small, the resulting nickel-sodium-containing composite oxide has small primary particles and it becomes less likely to cause cracks. In contrast, when the average particle size is too large, reactivity with the sodium source decreases, and the resulting primary particles of the nickel-sodium-containing composite oxide become too large and thus adhesion between the positive electrode active materials may deteriorate.

The particle size of primary particles of the resulting nickel-sodium-containing composite oxide can be controlled by the reaction temperature and the reaction time. Namely, the primary particle size can be increased by performing the reaction of the oxygen-containing nickel compound and the alkali metal source at higher temperature for a long time. However, when the reaction temperature is too high, the alkali metal source is volatilized and it tends to become difficult to precisely control the composition. Therefore, the reaction temperature is preferably 650° C. or lower.

At this time, there are no restrictions on the reaction time provided that the oxygen-containing nickel compound is quantitatively converted into the nickel sodium composite oxide, and the reaction time is preferably 1 hour or more, and more preferably 2 hours or more. When the reaction time is too short, the oxygen-containing nickel compound does not sufficiently react with the alkali metal source and the content of sodium in the resulting nickel-sodium-containing composite oxide decreases. Also, since primary particles do not sufficiently grow, sufficient distortion does not occur in the particles in case of the ion-exchange reaction described hereinafter. As a result, cracks may not be formed on the surface of primary particles.

The above reaction is preferably performed in an oxygen atmosphere.

As the alkali metal source, a lithium compound and a potassium compound can be used, in addition to a sodium compound. Specific examples of the sodium compound include $Na_2O$, $Na_2O_2$, $NaOH$, $Na_2CO_3$, $NaNO_3$, $NaHCO_3$, $NaOCH_3$, $NaOCH_2CH_3$, $NaOCH(CH_3)_2$, $NaOCOCH_3$ and $Na_2(OCO)_2$. Examples of the lithium compound include $LiOH.H_2O$, $Li_2CO_3$, $LiNO_3$, $Li_2O_2$, $Li_2O$ and $LiHCO_3$. As the potassium compound, $KOH$, $KNO_3$, $K_2CO_3$, $K_2O_2$, $K_2O$ and $KHCO_3$ can be used. The state of cracks on the surface of primary particles can be controlled by varying the composition of the alkali metal source. For example, the width of cracks and the distance between cracks can be decreased by containing lithium in the alkali metal source.

The alkali metal source is preferably used in an amount larger than a stoichiometric amount based on the oxygen-containing nickel compound. The reason is that shift of the stoichiometric ratio of the product caused by volatilization of the alkali metal source is sufficiently suppressed.

There are no restrictions on the method of mixing the oxygen-containing nickel compound with the alkali metal source and the method includes a method of mixing using a mortar.

The nickel-sodium-containing composite oxide has high reactivity with moisture in air and therefore a by-product such as an hydroxide may be produced when stored in an environment where the dew point is not controlled. Therefore, it is preferred to store in a dry atmosphere, for example, a dry atmosphere at a dew point of −40° C. or lower.

Then, the resulting particles of the nickel-sodium-containing composite oxide whose primary particles have an average particle size of 0.1 to 50 μm are mixed with a molten salt containing lithium and an ion-exchange reaction is performed to obtain particles of an alkali metal composite oxide having cracks on the surface of primary particles.

In the ion-exchange reaction, by exchanging sodium in the nickel-sodium-containing composite oxide whose primary particles have an average particle size of 0.1 to 50 μm, preferably 1 to 50 μm, with a lithium ion, distortion is generated in the particles due to a difference in the ionic radius between a sodium ion and a lithium ion, and thus cracks are formed on the surface of the particles by relieving distortion. Namely, the ionic radius of the sodium ion is 1.16 Å at hexa-coordination, whereas, the ionic radius of the sodium ion is 0.90 Å. Therefore, when $NaNiO_2$ is converted into $LiNiO_2$ by the ion exchange reaction, the volume of the particles shrinks by about 14%. Cracks are formed on the surface of the particles so as to relieve the volume shrinkage.

Examples of the lithium salt used to prepare a molten salt containing lithium include $LiOH.H_2O$, $Li_2CO_3$, $LiNO_3$, $Li_2O_2$, $Li_2O$, $LiHCO_3$, $LiF$, $LiCl$ and $LiBr$.

The above reaction proceeds by adding particles of the nickel-sodium-containing composite oxide in a molten salt containing lithium, followed by mixing and further maintaining for a predetermined time.

There are no restrictions on the temperature of the lithium molten salt in the above reaction provided that the temperature is the melting point or higher of a lithium salt and is a decomposition temperature or lower, and is preferably within a range from 250 to 400° C.

Also, the reaction time in the above reaction is preferably from 2 to 10 hours.

The reaction is preferably performed in a dry atmosphere at a dew point of −20° C. or lower, preferably a dew point of −40° C. or lower. The reason is that a decrease in the capacity of the positive electrode active material caused by production of an hydroxide as a by-product is suppressed.

In the reaction, the amount of lithium in the molten salt is preferably at least 5 times larger than a stoichiometric amount of the nickel-sodium-containing composite oxide. When the amount of lithium is less than 5 times of the stoichiometric amount of the nickel-sodium-containing composite oxide, the ion exchange reaction of sodium and lithium becomes insufficient and the capacity of the positive electrode active material may decreases. The reaction with the molten salt is preferably performed multiple times, thus making it possible to allow the ion exchange reaction of sodium and lithium to proceed sufficiently.

The positive electrode active material of the present embodiment can be obtained by water-washing the resulting nickel-alkali metal-containing composite oxide obtained by reacting with the molten salt. Washing with water is performed so as to prevent filling properties of the positive electrode active material from being impaired when the molten salt is left on the surface of particles.

The non-aqueous electrolyte secondary battery using the resulting positive electrode active material will be described with reference to FIG. 1.

FIG. 1 is a schematic sectional view showing one example of a non-aqueous electrolyte secondary battery as an embodiment of the present invention. The non-aqueous electrolyte secondary battery is configured such that a battery case 8 encasing an electrode group 12 and a non-aqueous electrolytic solution (not shown) is sealed with a sealing plate 10. The electrode group 12 has a structure that a sheet-like positive electrode (positive electrode plate) 1 with a positive electrode lead 2 and a sheet-like negative electrode (negative electrode plate) 3 with a negative electrode lead 4 are scrolled with a separator 5 interposed therebetween. An upper insulating plate 6 is provided to the upper portion of the electrode group 12, and a lower insulating plate 7 is provided to the lower portion. The sealing plate 10 is equipped with a gasket 9 and a positive electrode terminal 11.

The positive electrode plate is obtained by a method of pressure-bonding a positive electrode mix containing a positive electrode active material, a conductant agent and a binder on a positive electrode current collector, followed by rolling, or a method of applying a slurry prepared by dissolving or dispersing the positive electrode mix in a liquid medium, followed by drying and further rolling. Also, the negative electrode plate is obtained by a method of pressure-bonding a negative electrode mix containing a negative electrode active material, a binder and, if necessary, a conductant agent on a negative electrode current collector, followed by rolling, or a method of applying a slurry prepared by dissolving or dispersing the negative electrode mix in a liquid medium, followed by drying and further rolling.

As the negative electrode active material, for example, it is possible to use materials such as a silicon compound, a tin compound, a carbon material, metal, a metal fiber, an oxide, a nitride and various alloys. Of these materials, silicon compounds and tin compounds, for example, simple substances such as silicon (Si) and tin (Sn), an alloy, a compound, or a solid solution are preferably used in view of a large capacity density.

Specific examples of the silicon compound include Si, or an alloy, compound or solid solution in which a portion of Si in $SiO_x$ ($0.05 \leq x \leq 1.95$) is substituted with at least one element selected from the group consisting of B, Mg, Ni, Ti, Mo, Co, Ca, Cr, Cu, Fe, Mn, Nb, Ta, V, W, Zn, C, N and Sn. Specific examples of the tin compound include $Ni_2Sn_4$, $Mg_2Sn$, $SnO_x$ ($0<x<2$), $SnO_2$, $SnSiO_3$ and $LiSnO$. Specific examples of the carbon material include various natural graphites, coke, carbon fiber, spherical carbon, various artificial graphites, or amorphous carbon. These carbon materials may be used alone, or two or more kinds of them may be used in combination.

Specific examples of the conductant agent include graphites such as natural graphite and artificial graphite; carbon blacks such as acetylene black, Ketchen black, channel black, furnace black, lamp black and thermal black; conductive fibers such as carbon fiber and metal fiber; metal powders such as carbon powder fluoride and aluminum powder; conductive whiskers such as zinc oxide and potassium titanate; conductive metal oxides such as titanium oxide; and organic conductive materials such as a phenylene derivative.

Specific examples of the binder of the positive electrode and the binder of the negative electrode include polyvinylidene fluoride (PVDF), polytetrafluoroethylene, polyethylene, polypropylene, aramid resin, polyamide, polyimide, polyamideimide, polyacrylnitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, vinyl polyacetate, polyvinyl pyrrolidone, polyether, polyether sulfone, hexafluoropolypropylene, styrene-butadiene rubber and carboxymethyl cellulose. Also, it is possible to use copolymers of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid and hexadiene. These materials may be used alone, or two or more kinds of them may be used in combination.

The positive electrode mix and the negative electrode mix are obtained by mix-kneading the above components, or dissolving or dispersing the above components in a liquid medium.

As the liquid medium, for example, dehydrated N-methyl-2-pyrrolidone is used.

With respect to each proportion of the positive electrode active material, the conductant agent and the binder in the positive electrode mix, the proportion of the positive electrode active material is preferably within a range from 80 to 97% by mass, the conductant agent is preferably within a range from 1 to 20%, and the binder is preferably within a range from 2 to 7%. With respect to each proportion of the negative electrode active material, the conductant agent and the binder in the negative electrode mix, the proportion of the negative electrode active material is preferably within a range from 85 to 99% by mass, the conductant agent is preferably within a range from 0 to 5%, and the binder is preferably within a range from 1 to 10.

On the positive electrode current collector or the negative electrode current collector, the above positive electrode mix or negative electrode mix is coated by a pressure-bonding method or a method of applying a slurry, followed by drying.

As the current collector, for example, a continuous porous conductive substrate or an unporous conductive substrate is used. Specific examples of the conductive substrate used in the positive electrode current collector include stainless steel, aluminum and titanium. Specific examples of the conductive substrate used in the negative electrode current collector include stainless steel, nickel and copper. There are no restrictions on the thickness of the current collector, and the thickness is preferably from 1 to 500 μm, and more preferably from 5 to 20 μm in view of the fact that weight saving can be performed while maintaining the strength of the electrode plate.

Then, the resulting positive electrode plate and the negative electrode plate are disposed in a state where the negative and positive electrodes face each other with a separator interposed therebetween, and thus an electrode plate group is formed. As the separator, an insulating microporous thin film having large ion permeability and a predetermined mechanical strength is used. Examples of the separator include a sheet, a nonwoven fabric and a woven fabric, which are made of an olefinic polymer of PP and PE having organic solvent resistance and hydrophobicity alone or in combination, or a glass fiber.

Then, the electrode plate group is sealed in a battery case, together with a non-aqueous electrolyte, to obtain a non-aqueous electrolyte secondary battery.

As the non-aqueous electrolyte, for example, a liquid, gel-like or solid (polymer solid electrolyte) electrolyte is used.

The liquid non-aqueous electrolyte (non-aqueous electrolytic solution) is obtained by dissolving an electrolyte (for example, a lithium salt) in a non-aqueous solvent. Also, the gel-like non-aqueous electrolyte contains a non-aqueous electrolyte, and a polymer material which holds the non-aqueous electrolyte. As the polymer material, for example, polyvinylidene fluoride, polyacrylonitrile, polyethylene oxide, polyvinyl chloride, polyacrylate and polyvinylidene fluoride hexafluoropropylene are preferably used.

There are no restrictions on the kind of the non-aqueous solvent and a known non-aqueous solvent can be used as the non-aqueous solvent which dissolves the electrolyte. Specific examples thereof include a cyclic carbonate ester, a chain carbonate ester and a cyclic carboxylate ester. Examples of the cyclic carbonate ester include propylene carbonate (PC) and ethylene carbonate (EC). Examples of the chain carbonate ester include diethyl carbonate (DEC), ethylmethyl carbonate (EMC) and dimethyl carbonate (DMC). Examples of the cyclic carboxylate ester include γ-butyrolactone (GBL) and γ-valerolactone (GVL). These non-aqueous solvents may be used alone, or two or more kinds of them may be used in combination.

As the solute to be dissolved in the non-aqueous solvent, for example, $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, chloroborane lithium, borates and imide salts are used. Examples of the borates include lithium bis(1,2-benzenedioleate(2-)-O,O') borate, lithium bis(2,3-naphthalenedioleate(2-)-O,O')borate, lithium bis(2,2'-biphenyldioleate(2-)-O,O')borate and lithium bis(5-fluoro-2-oleate-1-benzenesulfonic acid-O,O') borate. Examples of the imide salts include bistrifluoromethanesulfonic acid imide lithium (($CF_3SO_2$)$_2$NLi), trifluoromethanesulfonic acid nonafluorobutanesulfonic acid imide lithium ($LiN(CF_3SO_2)(C_4F_9SO_2)$) and bispentafluoroethanesulfonic acid imide lithium (($C_2F_5SO_2$)$_2$NLi). These solutes may be used alone, or two or more kinds of them may be used in combination.

Also, the non-aqueous electrolytic solution may contain, as an additive, a material which is decomposed on a negative electrode to form a film having high lithium ion conductivity, thus increasing the charging and discharging efficiency. Examples of the additive having such a function include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 3-phenylvinylene carbonate, 3,4-diphenylvinylene carbonate, vinylethylene carbonate (VEC) and divinylethylene carbonate. These additives may be used alone, or two or more kinds of them may be used in combination. Of these additives, at least one kind selected from the group consisting of vinylene carbonate, vinylethylene carbonate and divinylethylene carbonate is preferred. A portion of the hydrogen atoms of the compound may be substituted with a fluorine atom. The amount of the electrolyte to be dissolved in the non-aqueous solvent is preferably within a range from 0.5 to 2 mol/L.

Figure 3:
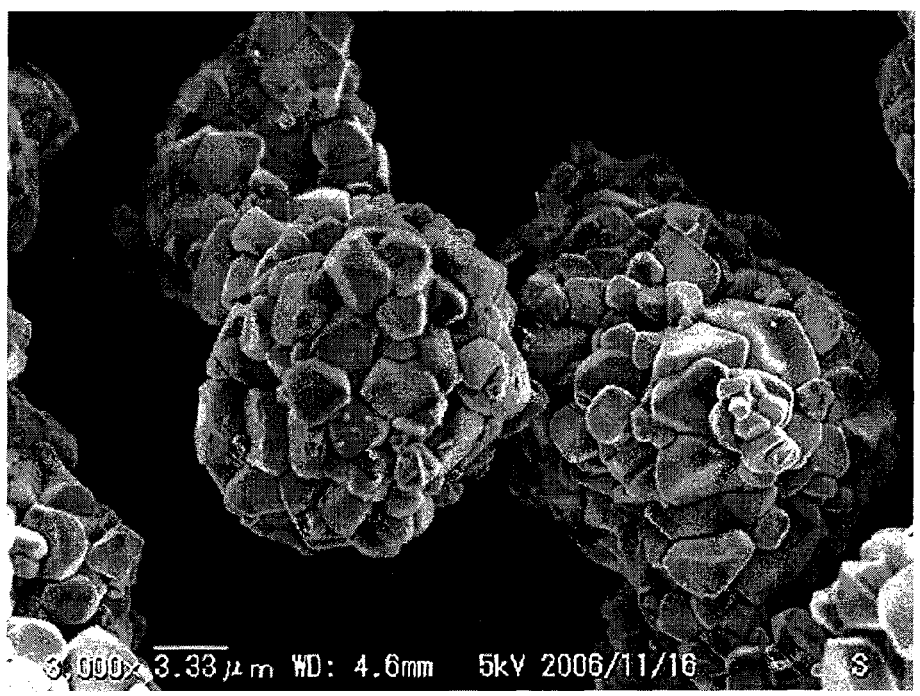
FIG. 3 is a macrophotograph at 3,000 times magnification taken under SEM of NaNiO$_2$ particles in Example 1.
Figure 4:
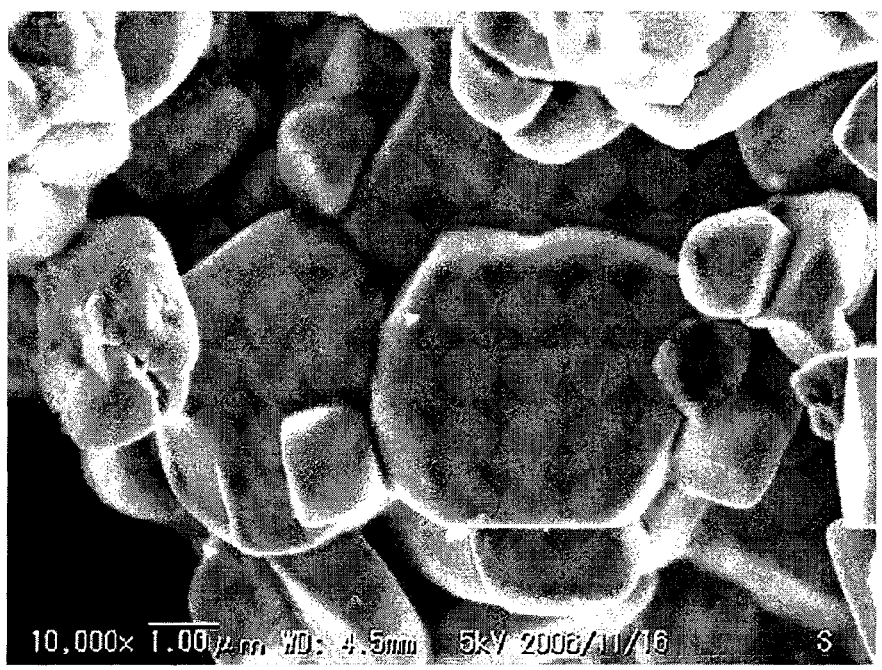
FIG. 4 is a macrophotograph at 10,000 times magnification taken under SEM of NaNiO$_2$ particles in Example 1.

Furthermore, the non-aqueous electrolytic solution may contain a known benzene derivative which is decomposed upon overcharging to form a film on the electrode, thus inactivating the battery. The benzene derivative preferably has a phenyl group, and a cyclic compound group adjacent to the phenyl group. The cyclic compound group is preferably a phenyl group, a cyclic ether group, a cyclic ester group, a cycloalkyl group or a phenoxy group. Specific examples of the benzene derivative include cyclohexylbenzene, oxide. Macrophotographs taken under a scanning electron microscope (SEM) of the $NaNiO_2$ particles are shown in FIG. 3 and FIG. 4. FIG. 3 is a macrophotograph at 3,000 times magnification, whereas FIG. 4 is a macrophotograph at 10,000 times magnification.

Then, the resulting $NaNiO_2$ was added in $LiNO_3$ melted at 300° C., followed by a reaction in a dry air atmosphere at a dew point of −40° C. for 3 hours. At this time, the amount of $LiNO_3$ was 20 equivalents based on $NaNiO_2$. The reaction product was cooled to room temperature and then ground in an agate mortar. To the ground product, 20 mL of ion-exchange water was added, followed by sufficient stirring and further suction filtration to obtain a powder. The resulting powder was reacted again in 20 equivalents of $LiNO_3$ melted at 300° C. for 3 hours, followed by cooling, grinding, washing with ion-exchange water and further suction filtration in a similar way to obtain a positive electrode active material A composed of a nickel lithium-containing composite oxide.

Figure 5:
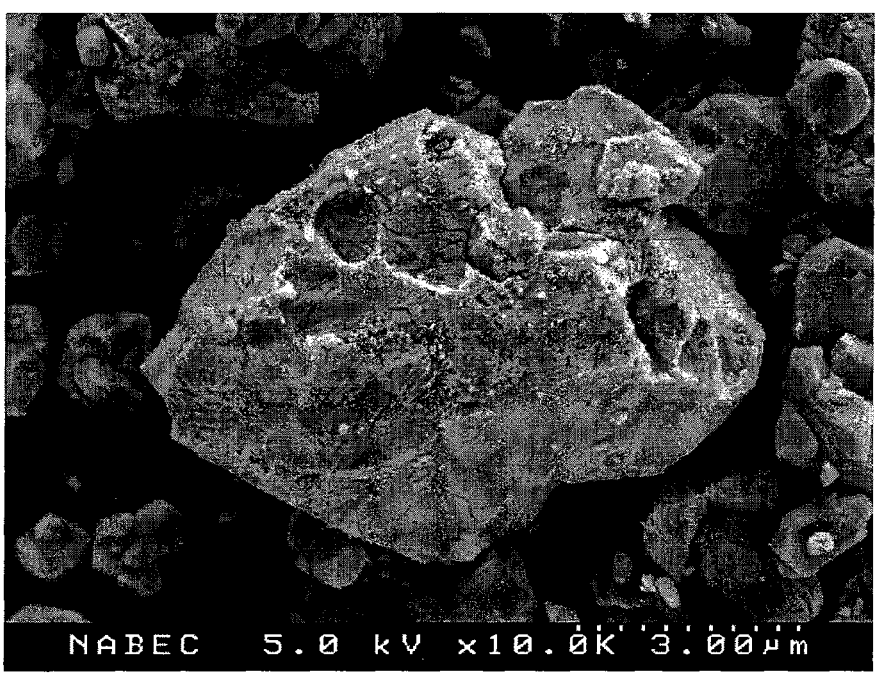
FIG. 5 is a macrophotograph at 10,000 times magnification taken under SEM of LiNiO$_2$ particles in Example 1.
Figure 6:
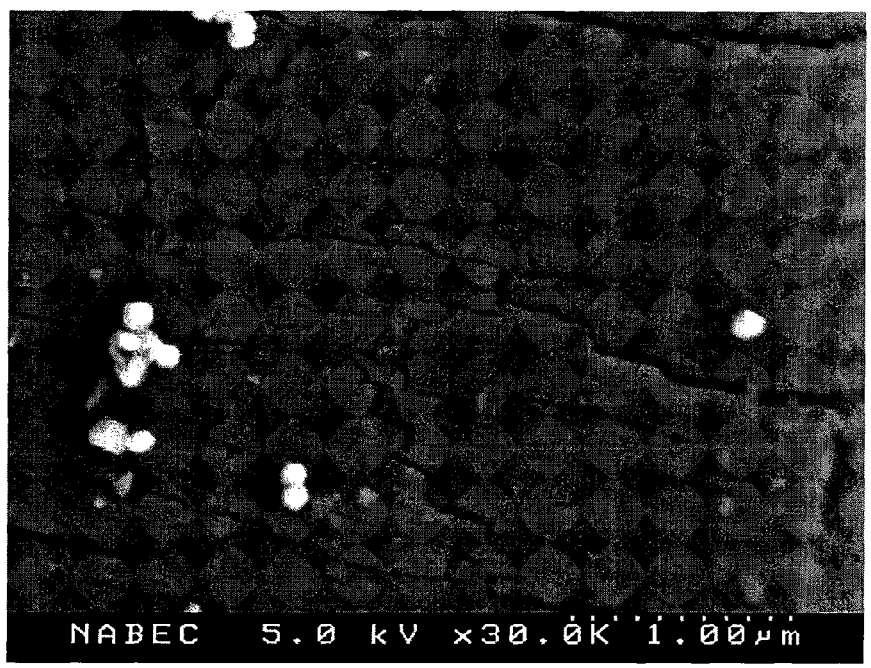
FIG. 6 is a macrophotograph at 30,000 times magnification taken under SEM of LiNiO$_2$ particles in Example 1.

ICP analysis of the positive electrode active material A specified that the content of the Na component is less than 1 mol % of the content of the Li component and the positive electrode active material is substantially composed of $LiNiO_2$. Macrophotographs taken under a scanning electron microscope (SEM) of the positive electrode active material A are shown in FIG. 5 and FIG. 6. FIG. 5 is a macrophotograph at 10,000 times magnification, whereas FIG. 6 is a macrophotograph at 30,000 times magnification.

From the macrophotograph shown in FIG. 5, particles of the biphenyl and diphenylether. These benzene derivatives may be used alone, or two or more kinds of them may be used in combination. The content of the benzene derivative is preferably 10% or less by volume based on the entire non-aqueous solvent.

The non-aqueous electrolyte secondary battery of the present invention may be applied to batteries having any shape and size, for example, a coin-shaped battery, a button-shaped battery, a sheet-shaped battery, a laminated battery, a cylindrical battery, a flat-shaped battery and a rectangular battery, and a large-sized battery used in a battery car.

EXAMPLES

The present invention will now be described by way of examples, but the present invention is not limited to the following examples.

Example 1

(i) Production of Positive Electrode Plate

Figure 2:
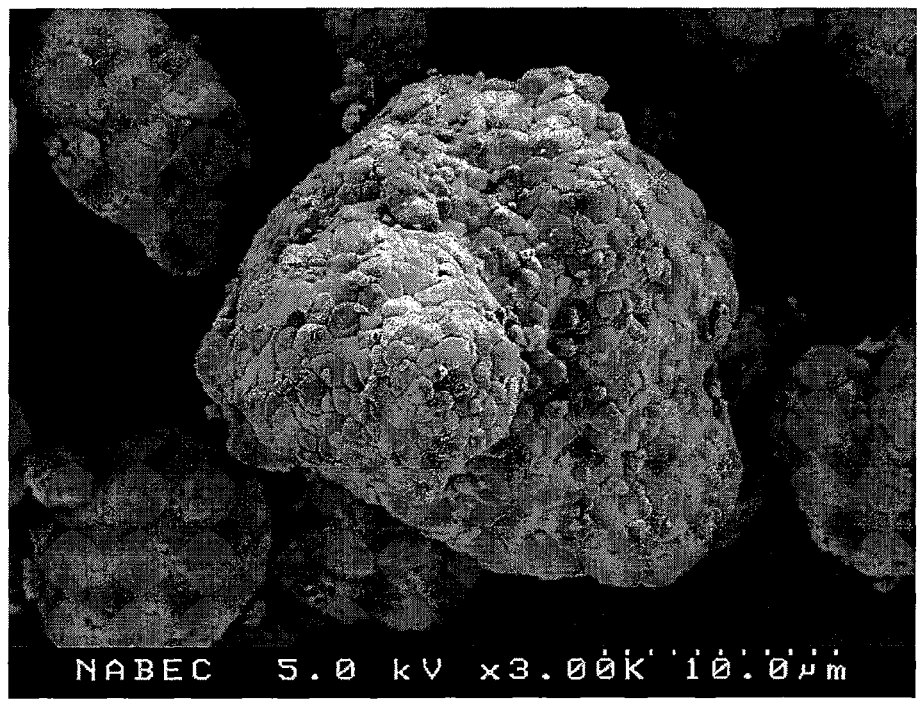
FIG. 2 is a macrophotograph at 3,000 times magnification taken under a scanning electron microscope (SEM) of NiO particles in Example 1.

A macrophotograph taken under a scanning electron microscope (SEM) of NiO (the average particle size of secondary particles is about 15 μm) manufactured by Kanto Chemical Co., Inc. is shown in FIG. 2. FIG. 2 is a macrophotograph at 3,000 times magnification.

To 3.738 g (50 mmol) of NiO, 0.525 equivalents of $Na_2O_2$ was added, followed by sufficient mixing in an agate mortar. The resulting mixture was reacted in an oxygen atmosphere at 650° C. for 12 hours to obtain $NaNiO_2$ whose primary particles have an average particle size of about 5 μm as a nickel-sodium-containing composite positive electrode active material A having an average particle size of about 5 μm, which exist in a state where substantially secondary particles are not formed, were observed. From the macrophotograph shown in FIG. 6, it was confirmed that cracks having a width of several to several tens of nanometers exist densely on the surface of the particles.

85 parts by mass of the resulting positive electrode active material A, 10 parts by mass of acetylene black as a conductant agent and 5 parts by mass of a polyvinylidene fluoride resin as a binder were mixed and then the mixture was dispersed in dehydrated N-methyl-2-pyrrolidone to prepare a slurry-like positive electrode mix. The resulting positive electrode mix was applied on a positive electrode current collector made of an aluminum foil, dried and then rolled to obtain a positive electrode plate.

(ii) Preparation of Non-Aqueous Electrolytic Solution

Lithium phosphate hexafluoride ($LiPF_6$) was dissolved in sulfolane in a concentration of 1.0 mol/L to prepare a non-aqueous electrolytic solution.

(iii) Production of Negative Electrode Plate 75 parts by mass of an artificial graphite powder, 20 parts by mass of acetylene black as a conductant agent and 5 parts by mass of a polyvinylidene fluoride resin as a binder were mixed and the mixture was dispersed in dehydrated N-methyl-2-pyrrolidone to prepare a slurry-like negative electrode mix. The resulting negative electrode mix was applied on a negative electrode current collector made of a copper foil, dried and then rolled to obtain a negative electrode plate.

(iv) Assembling of Battery

The positive electrode plate and the negative electrode plate were cut into pieces measuring 35 mm×35 mm and then ultrasonic-welded to an aluminum plate with a lead and a copper plate with a lead, respectively.

Negative and positive electrodes were integrated by fixing using a tape in a state where the negative and positive electrodes face each other with a microporous film separator made of polypropylene being interposed therebetween. Then, the resulting integrated article was encased in a cylindrical aluminum laminate bag having both ends open and one open end at the lead side of the bag was fused. Subsequently, the electrolytic solution prepared preliminarily was dropped from the other open end. The battery thus assembled was discharged at a current of 0.1 mA for one hour and deaerated under 10 mmHg for 10 seconds. And then, the open end from which the solution was injected was sealed by fusion. Then, preliminary charging and discharging was performed 5 times at a constant current of 7 mA within a range from an upper limit voltage of 4.2 V to a lower limit voltage of 3.0 V. The resulting battery is referred to as the battery of Example 1.

Example 2

Equivalent amounts of $Ni(OH)_2$ and $Mn_2O_3$ were mixed and then properly mixed and ground using a wet ball mill. The resulting ground mixture was reacted under an oxygen atmosphere at 700° C. for 12 hours to obtain $NiMnO_3$ whose secondary particles have an average particle size of 5 μm.

In the same manner as in Example 1, except that the resulting $NiMnO_3$ was used in place of NiO, $NaNi_{0.5}Mn_{0.5}O_2$ whose primary particles have an average particle size of 3 μm as a nickel-sodium-containing composite oxide was obtained. In the same manner as in Example 1, except that $NaNi_{0.5}Mn_{0.5}O_2$ was used in place of $NaNiO_2$, a positive electrode active material B made of a nickel-lithium-containing composite oxide was obtained.

The positive electrode active material B specified by ICP analysis had a composition of $Li_{0.99}Na_{0.01}Ni_{0.5}Mn_{0.5}O_2$. A macrophotograph taken under SEM of the positive electrode active material B was observed. As a result, particles converted into primary particles having an average particle size of about 2 to 3 μm were observed and also it was confirmed that cracks having a width of several to several tens of nanometers exist densely on the surface of the particles.

In the same manner as in Example 1, except that the positive electrode active material B was used in place of the positive electrode active material A, a battery was produced. The resulting battery is referred to as the battery of Example 2.

Example 3

To a mixed sulfuric acid solution prepared by dissolving 0.3337 mol/L of $NiSO_4 \cdot 6H_2O$ and 0.667 mol/L of $MnSO_4 \cdot 5H_2O$, a 1M $LiOH \cdot H_2O$ solution was added dropwise to obtain a coprecipitate. The coprecipitate was filtered, dried, ground and then classified to obtain a manganese nickel composite hydroxide whose secondary particles have an average particle size of 10 μm. To the manganese nickel composite hydroxide, 0.6 equivalents of $Na_2O_2$ was added, followed by sufficient mixing in an agate mortar. The resulting mixture was reacted under an oxygen atmosphere at 620° C. for 12 hours to obtain a nickel-sodium-containing composite oxide $NaNi_{0.33}Mn_{0.67}O_2$, primary particles of which have an average particle size of 2 μm.

Then, the resulting $NaNi_{0.33}Mn_{0.67}O_2$ was added in $LiNO_3$ melted at 400° C., followed by a reaction in a dry air atmosphere at a dew point of −40° C. for 3 hours. At this time, the amount of $LiNO_3$ was 10 equivalents based on $NaNi_{0.33}Mn_{0.67}O_2$. The reaction product was cooled to room temperature and then ground in an agate mortar. To the ground product, 20 mL of ion-exchange water was added, followed by sufficient stirring and further suction filtration to obtain a positive electrode active material C composed of a nickel lithium-containing composite oxide.

The positive electrode active material C specified by ICP analysis had a composition of $Li_{0.930}Na_{0.07}Ni_{0.33}Mn_{0.67}O_2$. A macrophotograph taken under SEM of the positive electrode active material C was observed. As a result, particles converted into primary particles having an average particle size of about 2 μm were observed and also it was confirmed that cracks having a width of several to several tens of nanometers exist densely on the surface of the particles.

In the same manner as in Example 1, except that the positive electrode active material C was used in place of the positive electrode active material A, a battery was produced. The resulting battery is referred to as the battery of Example 3.

Example 4

70 mol parts of $Ni(OH)_2$, 25 mol parts of $Co(OH)_2$ and 2.5 mol parts of $Al_2O_3$ were mixed using a wet ball mill and then properly mixed and ground using a wet ball mill. The resulting ground mixture was reacted under an oxygen atmosphere at 700° C. for 2 hours to obtain $Ni_{0.7}Co_{0.25}Al_{0.05}O_{1.03}$ whose secondary particles have an average particle size of 5 μm.

In the same manner as in Example 1, except that the resulting $Ni_{0.7}Co_{0.25}Al_{0.05}O_{1.03}$ was used in place of NiO, $NaNi_{0.7}Co_{0.25}Al_{0.05}O_2$ whose primary particles have an average particle size of 5 μm as a nickel-sodium-containing composite oxide was obtained.

In the same manner as in Example 1, except that $NaNi_{0.7}Co_{0.25}Al_{0.05}O_2$ was used in place of $NaNiO_2$ and the temperature of the treatment of the molten salt containing lithium was adjusted to 300° C., a positive electrode active material D composed of a nickel-lithium-containing composite oxide was obtained.

Figure 7:
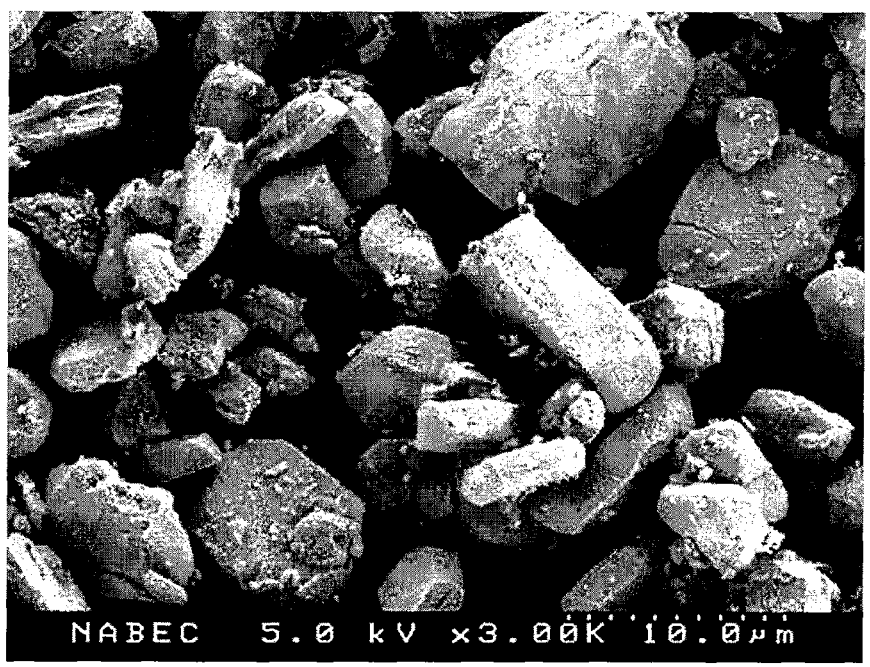
FIG. 7 is a macrophotograph at 3,000 times magnification taken under SEM of Li$_{0.99}$Na$_{0.01}$Ni$_{0.7}$Co$_{0.25}$Al$_{0.05}$O$_2$ particles in Example 4.
Figure 8:
FIG. 8 is a macrophotograph at 10,000 times magnification taken under SEM of Li$_{0.99}$Na$_{0.01}$Ni$_{0.7}$Co$_{0.25}$Al$_{0.05}$O$_2$ particles in Example 4.

The positive electrode active material D specified by ICP analysis had a composition of $Li_{0.99}Na_{0.01}Ni_{0.7}Co_{0.25}Al_{0.05}O_2$. Macrophotographs taken under a scanning electron microscope (SEM) of the positive electrode active material D are shown in FIG. 7 and FIG. 8. FIG. 7 is a macrophotograph at 3,000 times magnification, whereas FIG. 8 is a macrophotograph at 10,000 times magnification.

From the macrophotograph shown in FIG. 7, particles of the positive electrode active material D having an average particle size of about 5 μm, which exist in a state where substantially secondary particles are not formed, were observed. From the macrophotograph shown in FIG. 8, it was confirmed that cracks having a width of several to several tens of nanometers exist densely on the surface of the particles.

In the same manner as in Example 1, except that the positive electrode active material D was used in place of the positive electrode active material A, a battery was produced. The resulting battery is referred to as the battery of Example 4.

Example 5

To a mixed sulfuric acid solution prepared by dissolving $NiSO_4 \cdot 6H_2O$, $MnSO_4 \cdot 5H_2O$ and $CoSO_4 \cdot 7H_2O$ each in a concentration of 0.333 mol/L, a 1M $LiOH \cdot H_2O$ solution was added dropwise to obtain a coprecipitate. The resulting coprecipitate was filtered, dried, ground and then classified to obtain $Ni_{0.333}Mn_{0.333}Co_{0.333}(OH)_2$ whose secondary particles have an average particle size of 10 µm.

In the same manner as in Example 1, except that the resulting $Ni_{0.333}Mn_{0.333}Co_{0.333}(OH)_2$ was used in place of NiO to obtain $NaNi_{0.333}Mn_{0.333}Co_{0.333}O_2$ whose primary particles have an average particle size of 2 µm as a nickel-sodium-containing composite oxide was obtained.

In the same manner as in Example 1, except that $NaNi_{0.333}Mn_{0.333}Co_{0.333}O_2$ was used in place of $NaNiO_2$, a positive electrode active material E composed of a nickel-lithium-containing composite oxide was obtained.

The positive electrode active material E specified by ICP analysis had a composition of $Li_{0.99}Na_{0.01}Ni_{0.333}Mn_{0.333}Co_{0.333}O_2$. A macrophotograph taken under SEM of the positive electrode active material E was observed. As a result, particles converted into primary particles having an average particle size of about 2 µm were observed and also it was confirmed that cracks having a width of several to several tens of nanometers exist densely on the surface of the particles.

In the same manner as in Example 1, except that the positive electrode active material E was used in place of the positive electrode active material A, a battery was produced. The resulting battery is referred to as the battery of Example 5.

Example 6

95 mol parts of $Ni(OH)_2$ and 2.5 mol part of $Fe_2O_3$ were mixed and then properly mixed and ground using a wet ball mill. The resulting ground mixture was reacted under an oxygen atmosphere in oxygen at 700° C. for 12 hours to obtain $Ni_{0.95}Fe_{0.05}O$ whose secondary particles have an average particle size of 5 µm was obtained.

In the same manner as in Example 1, except that the resulting $Ni_{0.95}Fe_{0.05}O$ was used in place of NiO, $NaNi_{0.95}Fe_{0.05}O_2$ whose primary particles have an average particle size of 4 µm as a nickel-sodium-containing composite oxide was obtained.

In the same manner as in Example 1, except that $NaNi_{0.95}Fe_{0.05}O_2$ was used in place of $NaNiO_2$, a positive electrode active material F composed of a nickel-lithium-containing composite oxide was obtained.

The positive electrode active material F specified by ICP analysis had a composition of $Li_{0.98}Na_{0.02}Ni_{0.95}Fe_{0.05}O_{02}$. A macrophotograph taken under SEM of the positive electrode active material F was observed. As a result, particles converted into primary particles having an average particle size of about 4 µm were observed and also it was confirmed that cracks having a width of several to several tens of nanometers exist densely on the surface of the particles.

In the same manner as in Example 1, except that the positive electrode active material F was used in place of the positive electrode active material A, a battery was produced. The resulting battery is referred to as the battery of Example 6.

Example 7

70 mol % of $Ni(OH)_2$, 25 mol % of $Co(OH)_2$ and 5 mol % of $Cu(OH)_2$ were mixed and then properly mixed and ground using a wet ball mill. The resulting ground mixture was reacted under an oxygen atmosphere in oxygen at 700° C. for 12 hours to obtain $Ni_{0.7}Co_{0.25}Cu_{0.05}O$ whose secondary particles have an average particle size of 5 µm.

In the same manner as in Example 1, except that the resulting $Ni_{0.7}Co_{0.25}Cu_{0.05}O$ was used in place of NiO, $NaNi_{0.7}Co_{0.25}Cu_{0.05}O_2$ whose primary particles have an average particle size of 3 µm as a nickel-sodium-containing composite oxide was obtained.

In the same manner as in Example 1, except that $NaNi_{0.7}Co_{0.25}Cu_{0.05}O_2$ was used in place of $NaNiO_2$, a positive electrode active material G composed of a nickel-lithium-containing composite oxide was obtained.

The positive electrode active material G specified by ICP analysis had a composition of $Li_{0.99}Na_{0.01}Ni_{0.7}Co_{0.25}Cu_{0.05}O_2$. A macrophotograph taken under SEM of the positive electrode active material G was observed. As a result, particles converted into primary particles having an average particle size of about 3 µm were observed and also it was confirmed that cracks having a width of several to several tens of nanometers exist densely on the surface of the particles.

In the same manner as in Example 1, except that the positive electrode active material G was used in place of the positive electrode active material A, a battery was produced. The resulting battery is referred to as the battery of Example 7.

Example 8

95 mol % of $Ni(OH)_2$ and 5 mol % of $Mg(OH)_2$ were mixed and then properly mixed and ground using a wet ball mill. The resulting ground mixture was reacted under an oxygen atmosphere in oxygen at 700° C. for 12 hours to obtain $Ni_{0.95}Mg_{0.05}O$ whose secondary particles have an average particle size of 5 µm was obtained.

In the same manner as in Example 1, except that the resulting $Ni_{0.95}Mg_{0.05}O$ was used in place of NiO, $NaNi_{0.95}Mg_{0.05}O_2$ whose primary particles have an average particle size of 4 µm as a nickel-sodium-containing composite oxide was obtained.

In the same manner as in Example 1, except that $NaNi_{0.95}Mg_{0.05}O_2$ was used in place of $NaNiO_2$, a positive electrode active material H composed of a nickel-lithium-containing composite oxide was obtained.

The positive electrode active material H specified by ICP analysis had a composition of $Li_{0.99}Na_{0.01}Ni_{0.95}Mg_{0.05}O_2$. A macrophotograph taken under SEM of the positive electrode active material H was observed. As a result, particles converted into primary particles having an average particle size of about 4 µm were observed and also it was confirmed that cracks having a width of several to several tens of nanometers exist densely on the surface of the particles.

In the same manner as in Example 1, except that the positive electrode active material H was used in place of the positive electrode active material A, a battery was produced. The resulting battery is referred to as the battery of Example 8.

Example 9

95 mol % of $Ni(OH)_2$ and 5 mol % of anatase-type $TiO_2$ were mixed and then properly mixed and ground using a wet ball mill. The resulting ground mixture was reacted under an oxygen atmosphere in oxygen at 700° C. for 12 hours to obtain $Ni_{0.95}Ti_{0.05}O_{1.1}$ whose secondary particles have an average particle size of 5 μm.

In the same manner as in Example 1, except that the resulting $Ni_{0.95}Ti_{0.05}O_{1.1}$ was used in place of NiO, $NaNi_{0.95}Ti_{0.05}O_2$ whose primary particles have an average particle size of 2 μm as a nickel-sodium-containing composite oxide was obtained.

In the same manner as in Example 1, except that $NaNi_{0.95}Ti_{0.05}O_2$ was used in place of $NaNiO_2$, a positive electrode active material I composed of a nickel-lithium-containing composite oxide was obtained.

The positive electrode active material I specified by ICP analysis had a composition of $Li_{0.98}Na_{0.02}Ni_{0.95}Ti_{0.05}O_2$. A macrophotograph taken under SEM of the positive electrode active material I was observed. As a result, particles converted into primary particles having an average particle size of about 2 μm were observed and also it was confirmed that cracks having a width of several to several tens of nanometers exist densely on the surface of the particles.

In the same manner as in Example 1, except that the positive electrode active material I was used in place of the positive electrode active material A, a battery was produced. The resulting battery is referred to as the battery of Example 9.

Example 10

95 mol % of $Ni(OH)_2$ and 5 mol % of $ZrO_2$ were mixed and then properly mixed and ground using a wet ball mill. The resulting ground mixture was reacted under an oxygen atmosphere in oxygen at 700° C. for 12 hours to obtain $Ni_{0.95}Zr_{0.05}O_{1.1}$ whose secondary particles have an average particle size of 5 μm was obtained.

In the same manner as in Example 1, except that the resulting $Ni_{0.95}Zr_{0.05}O_{1.1}$ was used in place of NiO, $NaNi_{0.95}Zr_{0.05}O_2$ whose primary particles have an average particle size of 4 μm as a nickel-sodium-containing composite oxide was obtained.

In the same manner as in Example 1, except that $NaNi_{0.95}Zr_{0.05}O_2$ was used in place of $NaNiO_2$, a positive electrode active material J composed of a nickel-lithium-containing composite oxide was obtained.

The positive electrode active material J specified by ICP analysis had a composition of $Li_{0.99}Na_{0.01}Ni_{0.95}Zr_{0.05}O_2$. A macrophotograph taken under SEM of the positive electrode active material J was observed. As a result, particles converted into primary particles having an average particle size of about 4 μm were observed and also it was confirmed that cracks having a width of several to several tens of nanometers exist densely on the surface of the particles.

In the same manner as in Example 1, except that the positive electrode active material J was used in place of the positive electrode active material A, a battery was produced. The resulting battery is referred to as the battery of Example 10.

Example 11

95 mol % of $Ni(OH)_2$ and 5 mol % of $CeO_2$ were mixed and then properly mixed and ground using a wet ball mill. The resulting ground mixture was reacted under an oxygen atmosphere in oxygen at 700° C. for 12 hours to obtain $Ni_{0.95}Ce_{0.05}O_{1.1}$ whose secondary particles have an average particle size of 5 μm was obtained.

In the same manner as in Example 1, except that the resulting $Ni_{0.95}Ce_{0.05}O_{1.1}$ was used in place of NiO, $NaNi_{0.95}Ce_{0.05}O_2$ whose primary particles have an average particle size of 4 μm as a nickel-sodium-containing composite oxide was obtained.

In the same manner as in Example 1, except that $NaNi_{0.95}Ce_{0.05}O_2$ was used in place of $NaNiO_2$, a positive electrode active material K composed of a nickel-lithium-containing composite oxide was obtained.

The positive electrode active material K specified by ICP analysis had a composition of $Li_{0.99}Na_{0.01}Ni_{0.95}Ce_{0.05}O_2$. A macrophotograph taken under SEM of the positive electrode active material K was observed. As a result, particles converted into primary particles having an average particle size of about 4 μm were observed and also it was confirmed that cracks having a width of several to several tens of nanometers exist densely on the surface of the particles.

In the same manner as in Example 1, except that the positive electrode active material K was used in place of the positive electrode active material A, a battery was produced. The resulting battery is referred to as the battery of Example 11.

Example 12

95 mol parts of $Ni(OH)_2$ and 2.5 mol parts of $Y_2O_3$ were mixed and then properly mixed and ground using a wet ball mill. The resulting ground mixture was reacted under an oxygen atmosphere in oxygen at 700° C. for 12 hours to obtain $Ni_{0.95}Y_{0.05}O_{1.05}$ whose secondary particles have an average particle size of 5 μm.

In the same manner as in Example 1, except that the resulting $Ni_{0.95}Y_{0.05}O_{1.05}$ was used in place of NiO, $NaNi_{0.95}Y_{0.05}O_2$ whose primary particles have an average particle size of 4 μm as a nickel-sodium-containing composite oxide was obtained.

In the same manner as in Example 1, except that $NaNi_{0.95}Y_{0.05}O_2$ was used in place of $NaNiO_2$, a positive electrode active material L composed of a nickel-lithium-containing composite oxide was obtained.

The positive electrode active material L specified by ICP analysis had a composition of $Li_{0.99}Na_{0.01}Ni_{0.95}Y_{0.05}O_2$. A macrophotograph taken under SEM of the positive electrode active material L was observed. As a result, particles converted into primary particles having an average particle size of about 4 μm were observed and also it was confirmed that cracks having a width of several to several tens of nanometers exist densely on the surface of the particles.

In the same manner as in Example 1, except that the positive electrode active material L was used in place of the positive electrode active material A, a battery was produced. The resulting battery is referred to as the battery of Example 12.

Example 13

60 mol parts of $Ni(OH)_2$, 20 mol parts of $Co(OH)_2$ and 10 mol parts of $Al_2O_3$ were mixed and then properly mixed and ground using a wet ball mill. The resulting ground mixture was reacted under an oxygen atmosphere in oxygen at 700° C. for 12 hours to obtain $Ni_{0.6}Co_{0.2}Al_{0.2}O_{1.1}$ whose secondary particles have an average particle size of 5 μm was obtained.

In the same manner as in Example 1 except that the resulting $Ni_{0.6}Co_{0.2}Al_{0.2}O_{1.1}$ was used in place of NiO, $NaNi_{0.6}Co_{0.2}Al_{0.2}O_2$ whose primary particles have an average particle size of 4 μm as a nickel-sodium-containing composite oxide was obtained.

In the same manner as in Example 1, except that $NaNi_{0.6}Co_{0.2}Al_{0.2}O_2$ was used in place of $NaNiO_2$, a positive electrode active material M composed of a nickel-lithium-containing composite oxide was obtained.

The positive electrode active material M specified by ICP analysis had a composition of $Li_{0.98}Na_{0.02}Ni_{0.6}Co_{0.2}Al_{0.2}O_2$. A macrophotograph taken under SEM of the positive electrode active material M was observed. As a result, particles converted into primary particles having an average particle size of about 4 μm were observed and also it was confirmed that cracks having a width of several to several tens of nanometers exist densely on the surface of the particles.

In the same manner as in Example 1, except that the positive electrode active material M was used in place of the positive electrode active material A, a battery was produced. The resulting battery is referred to as the battery of Example 13.

Example 14

To 3.738 g (50 mmol) of NiO manufactured by Kanto Chemical Co., Inc., 0.525 equivalents of $Na_2O_2$ was added, followed by sufficient mixing in an agate mortar. Then, the resulting mixture was reacted in an oxygen atmosphere at 620° C. for 12 hours to obtain $NaNiO_2$ whose primary particles have an average particle size of 3 μm as a nickel-sodium-containing composite oxide.

Then, the resulting $NaNiO_2$ was added in $LiNO_3$ melted at 300° C., followed by a reaction in a dry air atmosphere at a dew point of −40° C. for 3 hours. At this time, the amount of $LiNO_3$ was 10 equivalents based on $NaNiO_2$. The reaction product was cooled to room temperature and then ground in an agate mortar. To the product, 20 mL of ion-exchange water was added, followed by sufficient stirring and further suction filtration to obtain a positive electrode active material N composed of a nickel-lithium-containing composite oxide.

The positive electrode active material N specified by ICP analysis had a composition of $Li_{0.96}Na_{0.04}NiO_2$. A macrophotograph taken under SEM of the positive electrode active material N was observed. As a result, particles converted into primary particles having an average particle size of about 3 μm were observed and also it was confirmed that cracks having a width of several to several tens of nanometers exist densely on the surface of the particles.

In the same manner as in Example 1, except that the positive electrode active material N was used in place of the positive electrode active material A, a battery was produced. The resulting battery is referred to as the battery of Example 14.

Example 15

To 3.738 g (50 mmol) of NiO manufactured by Kanto Chemical Co., Inc., 0.525 equivalents of $Na_2O_2$ was added, followed by sufficient mixing in an agate mortar. Then, the resulting mixture was reacted in an oxygen atmosphere at 620° C. for 12 hours to obtain $NaNiO_2$ whose primary particles have an average particle size of 3 μm as a nickel-sodium-containing composite oxide.

Then, the resulting $NaNiO_2$ was added in $LiNO_3$ melted at 300° C., followed by a reaction in a dry air atmosphere at a dew point of −40° C. for 3 hours. At this time, the amount of $LiNO_3$ was 4 equivalents based on $NaNiO_2$. The reaction product was cooled to room temperature and then ground in an agate mortar. To the product, 20 mL of ion-exchange water was added, followed by sufficient stirring and further suction filtration to obtain a positive electrode active material O composed of a nickel-lithium-containing composite oxide.

The positive electrode active material O specified by ICP analysis had a composition of $Li_{0.89}Na_{0.11}NiO_2$. A macrophotograph taken under SEM of the positive electrode active material O was observed. As a result, particles converted into primary particles having an average particle size of about 3 μm were observed and also it was confirmed that cracks having a width of several to several tens of nanometers exist densely on the surface of the particles.

In the same manner as in Example 1, except that the positive electrode active material O was used in place of the positive electrode active material A, a battery was produced. The resulting battery is referred to as the battery of Example 15.

Comparative Example 1

50 mmol of $Ni(OH)_2$, 25 mmol of $Mn_2O_3$ and 25 mmol of $Na_2CO_3$ were mixed, sufficiently mixed and ground using a wet ball mill for one day and then dried. The dried mixture was ground again and then formed into a pellet. The pellet was reacted in air at 900° C. for 24 hours. The pellet was rapid-quenched using a copper plate to obtain $NaNi_{0.5}Mn_{0.5}O_2$ whose secondary particles have an average particle size of 10 μm. $NaNi_{0.5}Mn_{0.5}O_2$ was quickly transferred to an argon glove box and then ground in the box. At this time, $NaNi_{0.5}Mn_{0.5}O_2$ whose primary particles have an average particle size of 1 μm as a nickel-sodium-containing composite oxide was obtained.

An ion-exchange reaction of sodium and lithium was performed by treating $NaNi_{0.5}Mn_{0.5}O_2$ in a $LiNO_3/LiCl$ molten salt (mass ratio: 87/13) containing 10 equivalents of Li at 280° C. for 5 hours. The resulting mixture was washed with ion-exchange water, washed with ethanol and then subjected to suction filtration. The resulting powder was washed again with ion exchange water to obtain a comparative positive electrode active material P.

Figure 9:
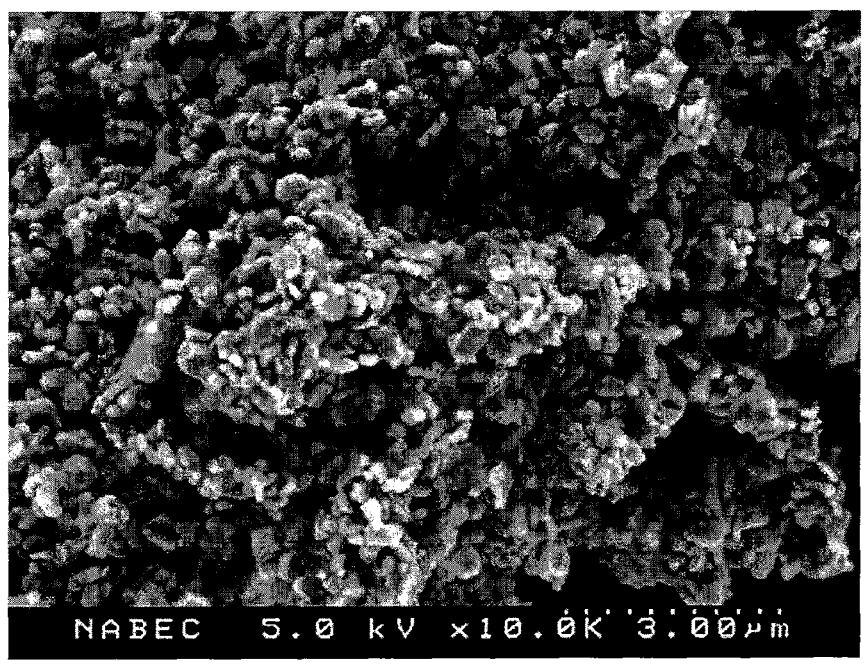
FIG. 9 is a macrophotograph at 10,000 times magnification taken under SEM of Li$_{0.99}$Na$_{0.01}$Ni$_{0.5}$Mn$_{0.5}$O$_2$ particles in Comparative Example 1.
Figure 10:
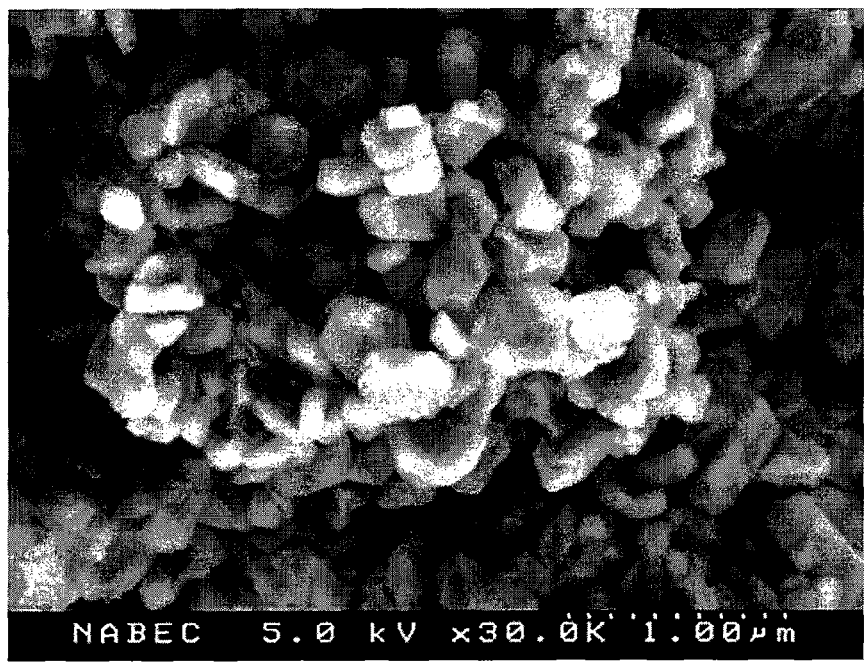
FIG. 10 is a macrophotograph at 30,000 times magnification taken under SEM of Li$_{0.99}$Na$_{0.01}$Ni$_{0.5}$Mn$_{0.5}$O$_2$ particles in Comparative Example 1.

The comparative positive electrode active material P specified by ICP analysis had a composition of $Li_{0.99}Na_{0.01}Ni_{0.5}Mn_{0.5}O_2$. Macrophotographs taken under a scanning electron microscope (SEM) of the comparative positive electrode active material P are shown in FIG. 9 and FIG. 10. FIG. 9 is a macrophotograph at 10,000 times magnification, whereas FIG. 10 is a macrophotograph at 30,000 times magnification.

From the macrophotograph shown in FIG. 9, particles of the comparative positive electrode active material P, in which primary particles having an average particle size of about 1 μm exist in an aggregated state, were observed. From the macrophotograph shown in FIG. 10, the particles had a smooth surface and cracks were not confirmed.

In the same manner as in Example 1, except that the positive electrode active material P was used in place of the positive electrode active material A, a battery was produced. The resulting battery is referred to as the battery of Comparative Example 1.

Comparative Example 2

$Ni(OH)_2$ was preliminarily treated at 300° C. and then classified to produce NiO whose secondary particles have an average particle size of 7 μm. 50 mmol of the resulting NiO and 25 mmol of $Li_2CO_3$ were mixed in ethanol for 3 hours, dried and then reacted in an oxygen atmosphere at 735° C. for 15 hours to obtain a comparative positive electrode active material Q.

The comparative positive electrode active material Q specified by ICP analysis had a composition of $LiNiO_2$. A macrophotograph taken under SEM of the comparative positive electrode active material Q was observed. As a result, primary particles having a particle size of less than 1 μm form secondary particles having a particle size of about 7 μm, and the primary particles had a smooth surface and cracks were not confirmed.

In the same manner as in Example 1, except that the comparative positive electrode active material Q was used in place of the positive electrode active material A, a battery was produced. The resulting battery is referred to as the battery of Comparative Example 2.

Comparative Example 3

70 mol parts of $Ni(OH)_2$, 25 mol parts of $Co(OH)_2$ and 2.5 mol parts of $Al_2O_3$ were mixed, properly mixed and ground using a wet ball mill and dried, and then $LiOH \cdot H_2O$ was added in same molar amount as the total amount of Ni, Co and Al, followed by a reaction at 735° C. for 15 hours to obtain a comparative positive electrode active material R.

Figure 11:
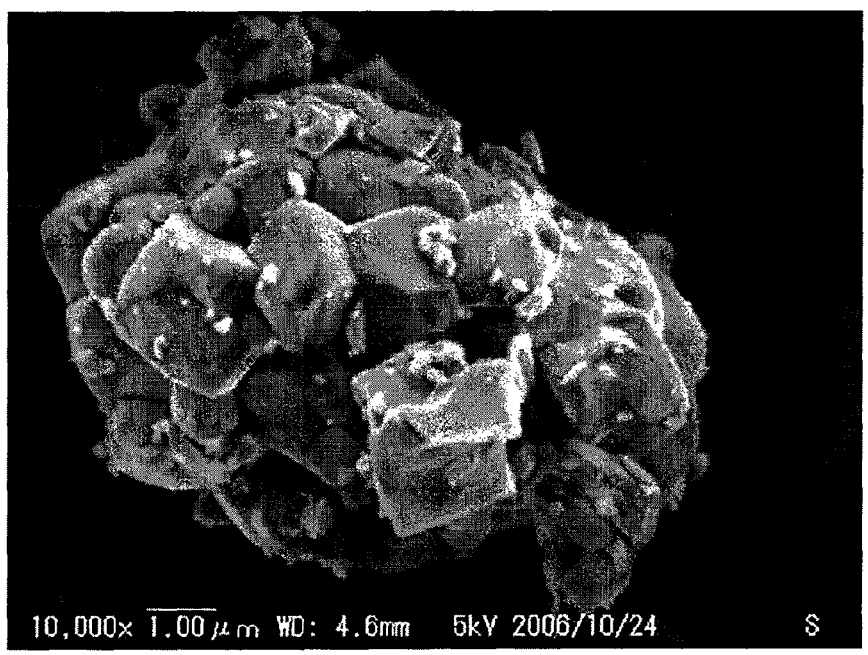
FIG. 11 is a macrophotograph at 10,000 times magnification taken under SEM of LiNi$_{0.7}$Co$_{0.25}$Al$_{0.5}$O$_2$ particles in Comparative Example 3.

The comparative positive electrode active material R specified by ICP analysis had a composition of $LiNi_{0.7}Co_{0.25}Al_{0.5}O_2$. A macrophotograph at 10,000 times magnification taken under a scanning electron microscope (SEM) of the comparative positive electrode active material R is shown in FIG. 11. In the macrophotograph shown in FIG. 11, it was observed that primary particles having an average particle size of about 1 μm are aggregated to form secondary particles having an average particle size of about 10 μm. Also, the primary particles had a smooth surface and cracks were not confirmed.

In the same manner as in Example 1, except that the comparative positive electrode active material R was used in place of the positive electrode active material A, a battery was produced. The resulting battery is referred to as the battery of Comparative Example 3.

(Evaluation)

With respect to the batteries of Examples 1 to 15 and Comparative Examples 1 to 3, charging and discharging were repeated under the conditions of an environmental temperature of 25° C., a constant current (12 mA) of one hour-rate, a voltage range from an upper limit voltage of 4.2 V to a lower limit voltage of 3.0 V. The value obtained by standardizing the discharge capacity of the 1st cycle and the discharge capacity of the 50th cycle per unit mass of a positive electrode active material, and the ratio of the discharge capacity of the 50th cycle to the discharge capacity of the 1st cycle are shown in Table 1

TABLE 1

| Battery | Discharge capacity (A) of the 1st cycle (mAh/g) | Discharge capacity (B) of the 50th cycle (mAh/g) | (B)/(A) |
|---|---|---|---|
| Example 1 | 201 | 163 | 0.811 |
| Example 2 | 166 | 143 | 0.861 |
| Example 3 | 171 | 142 | 0.830 |
| Example 4 | 187 | 176 | 0.941 |
| Example 5 | 148 | 142 | 0.959 |
| Example 6 | 181 | 168 | 0.928 |
| Example 7 | 176 | 162 | 0.920 |
| Example 8 | 184 | 167 | 0.908 |
| Example 9 | 189 | 171 | 0.905 |
| Example 10 | 186 | 161 | 0.866 |
| Example 11 | 185 | 160 | 0.865 |
| Example 12 | 183 | 159 | 0.869 |
| Example 13 | 135 | 121 | 0.896 |
| Example 14 | 197 | 158 | 0.802 |
| Example 15 | 195 | 152 | 0.779 |
| Comparative Example 1 | 167 | 121 | 0.725 |
| Comparative Example 2 | 187 | 134 | 0.717 |
| Comparative Example 3 | 189 | 138 | 0.730 |

All batteries of Examples 1 to 15 exhibited excellent charging and discharging cycle lifetime characteristics, namely, the ratio of the discharge capacity of the 50th cycle (B) to the discharge capacity of the 1st cycle (A), ((B)/(A)), exceeds 0.77. In contrast, the batteries of Comparative Examples 1 to 3 were inferior in characteristics, namely, the ratio was less than 0.73.

The reason why the batteries of Examples 1 to 15 are excellent in charging and discharging cycle lifetime characteristics is considered as follows. On the surface of the primary particles of the nickel-lithium-containing composite oxides of Examples 1 to 15, cracks are formed. These cracks relieve volume variation of the particles upon charging and discharging. Therefore, swelling of the positive electrode plate caused by repeating charging and discharging cycle is suppressed and electrical contact between the positive electrode active materials are satisfactorily maintained, and thus charging and discharging cycle lifetime characteristics were improved.

The battery of Example 15 exhibited a ratio (B)/(A) of 0.779, which was slightly lower than that in the batteries of Examples 1 to 14. It is considered that since the positive electrode active material used in the battery of Example 15 contains comparatively a large amount of sodium, a sodium compound having high reactivity with the electrolytic solution is produced in the artificial graphite of the negative electrode and thus a side reaction occurred during charging and discharging. The reason why the amount of sodium in the positive electrode active material is large in Example 15 is that the amount of Li in the molten salt is 4 times larger than that of the active material and the number of treatments of the molten salt is one time.

Also, the battery of Example 13 exhibited a high ratio (B)/(A) of 0.896 and also good charging and discharging cycle lifetime characteristics. However, the discharge capacity of the 1st cycle was 135 mAh/g and was slightly lower than the discharge capacity of 140 mAh/g of $LiCoO_2$ which is now commonly used. The reason is considered that the amount of Co and the amount of Al were respectively 0.2, which is comparatively large, in the composition formula of the positive electrode active material. In contrast, the battery of Example 5 in which the amount of Co is 0.33 exhibited a discharge capacity of the 1st cycle of 148 mAh/g which is higher than that of $LiCoO_2$.

The reason why batteries of Comparative Examples 1 to 3 are inferior in charging and discharging cycle lifetime characteristics is that cracks were not formed on the surface of particles of the positive electrode active materials of Comparative Examples 1 to 3. Therefore, when the positive electrode active material causes large volume variation by repeating a charging and discharging cycle, the positive electrode plate swells and electrical contact between the positive electrode active materials becomes inferior, resulting in deterioration of charging and discharging cycle lifetime characteristics. In the battery of Comparative Example 1, although sodium in the nickel-sodium-containing composite oxide was substituted with lithium by the ion exchange reaction, cracks were not formed on the surface of primary particles. The reason is considered that primary particles did not sufficiently grow because the content of manganese was too large, that a large number of grain boundaries exist in the particles and distortion in the particles generated upon the ion exchange reaction was relieved by the grain boundaries.

As a result, it was found that a secondary battery, using a positive electrode active material composed of at least particles of an alkali metal composite oxide containing nickel in which cracks are formed on the surface of particles, is excellent in lifetime characteristics.

Example 16

NiO was ground in a jet mill and then classified to obtain NiO having a secondary particle size of about 0.2 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 590° C. for 12 hours to obtain $NaNiO_2$ whose primary particles have an average particle size of 0.3 μm as a nickel-sodium-containing composite oxide.

In the same manner as in Example 1, except that the resulting $NaNiO_2$ was used in place of $NaNiO_2$ of Example 1, a positive electrode active material S composed of a nickel-lithium-containing composite oxide was obtained.

The positive electrode active material S specified by ICP analysis had a composition of $LiNiO_2$. A macrophotograph taken under SEM of the positive electrode active material S was observed. As a result, particles converted into primary particles having an average particle size of about 0.2 to 0.3 μm were observed and also it was confirmed that cracks having a width of several to several tens of nanometers exist densely on the surface of the particles.

In the same manner as in Example 1, except that the positive electrode active material S was used in place of the positive electrode active material A, a battery was produced. The resulting battery is referred to as the battery of Example 16.

Example 17

NiO was ground in a jet mill and then classified to obtain NiO having a secondary particle size of about 1 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 600° C. for 12 hours to obtain $NaNiO_2$ whose primary particles have an average particle size of 1 μm as a nickel-sodium-containing composite oxide.

In the same manner as in Example 1, except that the resulting $NaNiO_2$ was used in place of $NaNiO_2$ of Example 1, a positive electrode active material T composed of a nickel-lithium-containing composite oxide was obtained.

The positive electrode active material T specified by ICP analysis had a composition of $LiNiO_2$. A macrophotograph taken under SEM of the positive electrode active material T was observed. As a result, particles converted into primary particles having an average particle size of about 1 μm were observed and also it was confirmed that cracks having a width of several to several tens of nanometers exist densely on the surface of the particles.

In the same manner as in Example 1, except that the positive electrode active material T was used in place of the positive electrode active material A, a battery was produced. The resulting battery is referred to as the battery of Example 17.

Example 18

NiO was classified to obtain NiO having a secondary particle size of about 10 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 670° C. for 12 hours to obtain $NaNiO_2$ whose primary particles have an average particle size of 10 μm as a nickel-sodium-containing composite oxide.

In the same manner as in Example 1, except that the resulting $NaNiO_2$ was used in place of $NaNiO_2$ of Example 1, a positive electrode active material U composed of a nickel-lithium-containing composite oxide was obtained.

The positive electrode active material specified by ICP analysis had a composition of U had a composition of $Li_{0.98}Na_{0.02}NiO_2$. A macrophotograph taken under SEM of the positive electrode active material U was observed. As a result, particles converted into primary particles having an average particle size of about 10 μm were observed and also it was confirmed that cracks having a width of several to several tens of nanometers exist densely on the surface of the particles.

In the same manner as in Example 1, except that the positive electrode active material U was used in place of the positive electrode active material A, a battery was produced. The resulting battery is referred to as the battery of Example 18.

Example 19

NiO was classified to obtain NiO having a secondary particle size of about 40 μm. To 3.738 g (50 mmol) of the resulting NiO, 1 equivalents of $Na_2O_2$ was added, followed by sufficient mixing in an agate mortar. Then, the resulting mixture was reacted in an oxygen atmosphere at 700° C. for 2 hours to obtain $NaNiO_2$ whose primary particles have an average particle size of 20 μm as a nickel-sodium-containing composite oxide was obtained.

In the same manner as in Example 1, except that the resulting $NaNiO_2$ was used in place of $NaNiO_2$ of Example 1, a positive electrode active material V composed of a nickel-lithium-containing composite oxide was obtained.

The positive electrode active material V specified by ICP analysis had a composition of $Li_{0.91}Na_{0.03}NiO_{1.97}$. A macrophotograph taken under SEM of the positive electrode active material V was observed. As a result, particles converted into primary particles having an average particle size of about 20 μm were observed and also it was confirmed that cracks having a width of several to several tens of nanometers exist densely on the surface of the particles.

In the same manner as in Example 1, except that the positive electrode active material V was used in place of the positive electrode active material A, a battery was produced. The resulting battery is referred to as the battery of Example 19.

Example 20

NiO was classified to obtain NiO having a secondary particle size of about 60 μm. To 3.738 g (50 mmol) of the resulting NiO, 1 equivalent of $Na_2O_2$ was added, followed by sufficient mixing in an agate mortar. Then, the resulting mixture was reacted in an oxygen atmosphere at 800° C. for 2 hours to obtain NaNiO$_2$ whose primary particles have an average particle size of 40 μm as a nickel-sodium-containing composite oxide was obtained.

In the same manner as in Example 1, except that the resulting NaNiO$_2$ was used in place of NaNiO$_2$ of Example 1, a positive electrode active material W composed of a nickel lithium-containing composite oxide was obtained.

The positive electrode active material W specified by ICP analysis had a composition of $Li_{0.86}Na_{0.04}NiO_{1.95}$. A macrophotograph taken under SEM of the positive electrode active material W was observed. As a result, particles converted into primary particles having an average particle size of about 40 μm were observed and also it was confirmed that cracks having a width of several to several tens of nanometers exist densely on the surface of the particles.

In the same manner as in Example 1, except that the positive electrode active material W was used in place of the positive electrode active material A, a battery was produced. The resulting battery is referred to as the battery of Example 20.

(Evaluation)

With respect to the batteries of Examples 16 to 20, charging and discharging were repeated under the conditions of an environmental temperature of 25° C., a constant current (12 mA) of one hour-rate, a voltage range from an upper limit voltage of 4.2 V to a lower limit voltage of 3.0 V. The value obtained by standardizing the discharge capacity of the 1st cycle and the discharge capacity of the 50th cycle per unit mass of the positive electrode active material, and the ratio of the discharge capacity of the 50th cycle to the discharge capacity of the 1st cycle are shown in Table 2

TABLE 2

| Battery | Discharge capacity (A) of the 1st cycle (mAh/g) | Discharge capacity (B) of the 50th cycle (mAh/g) | (B)/(A) |
|---|---|---|---|
| Example 16 | 174 | 145 | 0.833 |
| Example 17 | 203 | 165 | 0.813 |
| Example 18 | 198 | 161 | 0.813 |
| Example 19 | 191 | 155 | 0.812 |
| Example 20 | 161 | 129 | 0.801 |

All batteries of Examples 16 to 20 exhibited excellent charging and discharging cycle lifetime characteristics, namely, the ratio of the discharge capacity of the 50th cycle (B) to the discharge capacity of the 1st cycle (A), ((B)/(A)), exceeds 0.8.

The discharge capacity of the 1st cycle (A) of the battery of Example 16 was 174 mAh/g and that of the battery of Example 20 was 161 mAh/g, and were lower than that in the batteries of Examples 17 to 19. The reason is considered that the positive electrode active material used in the battery of Example 16 had a small average particle size of 0.2 to 0.3 μm and the specific surface area of the positive electrode active material increases, and thus the amount of 10 parts by mass of acetylene black as a conductant agent is too small and charging and discharging rate characteristics deteriorate, resulting in a decreased discharge capacity. Also, in the positive electrode active material used in the battery of Example 20, NiO as the production raw material had a large average particle size of 60 μm, and thus reactivity to Na$_2$O$_2$ decreased and the unreacted NiO remained, resulting in a decreased discharge capacity.

Example 21

NiO was classified to obtain NiO having a secondary particle size of about 5 μm. To 3.738 g (50 mmol) of the resulting NiO, 0.5 equivalents of Na$_2$O$_2$ was added, followed by sufficient mixing in an agate mortar. Then, the resulting mixture was reacted in an oxygen atmosphere at 620° C. for 12 hours to obtain NaNiO$_2$ whose primary particles have an average particle size of 3 μm as a nickel-sodium-containing composite oxide.

Then, the resulting NaNiO$_2$ was added in LiNO$_3$ melted at 300° C., followed by a reaction in a dry air atmosphere at a dew point of −40° C. for 3 hours. At this time, the amount of LiNO$_3$ was 20 equivalents to NaNiO$_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of LiNO$_3$ melted at 300° C. for 3 hours, cooled, ground, washed with ion-exchange water and suction-filtered to obtain a positive electrode active material X composed of a nickel-lithium-containing composite oxide.

The positive electrode active material X specified by ICP analysis had a composition of $Li_{0.96}NiO_{1.98}$. A macrophotograph taken under SEM of the positive electrode active material Y was observed. As a result, particles converted into primary particles having an average particle size of about 3 μm were observed and also it was confirmed that cracks having a width of several to several tens of nanometers exist densely on the surface of the particles.

In the same manner as in Example 1, except that the positive electrode active material X was used in place of the positive electrode active material A, a battery was produced. The resulting battery is referred to as the battery of Example 21.

Example 22

NiO was classified to obtain NiO having a secondary particle size of about 5 μm. To 3.738 g (50 mmol) of the resulting NiO, 0.525 equivalents of Na$_2$O$_2$ was added, followed by sufficient mixing in an agate mortar. Then, the resulting mixture was reacted in an oxygen atmosphere at 650° C. for 12 hours to obtain NaNiO$_2$ whose primary particles have an average particle size of 5 μm as a nickel-sodium-containing composite oxide.

Then, the resulting NaNiO$_2$ was added in LiNO$_3$ melted at 300° C., followed by a reaction in a dry air atmosphere at a dew point of −40° C. for 3 hours. At this time, the amount of LiNO$_3$ was 20 equivalents to NaNiO$_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of LiNO$_3$ melted at 300° C. for 3 hours, cooled, ground, washed with ion-exchange water and suction-filtered to obtain a positive electrode active material Y composed of a nickel-lithium-containing composite oxide.

The positive electrode active material Y specified by ICP analysis had a composition of $Li_{0.98}NiO_2$. A macrophotograph taken under SEM of the positive electrode active material Y was observed. As a result, particles converted into primary particles having an average particle size of about 5 μm were observed and also it was confirmed that cracks having a width of several to several tens of nanometers exist densely on the surface of the particles.

In the same manner as in Example 1, except that the positive electrode active material Y was used in place of the positive electrode active material A, a battery was produced. The resulting battery is referred to as the battery of Example 22.

Example 23

NiO was classified to obtain NiO having a secondary particle size of about 5 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 600° C. for 12 hours to obtain $NaNiO_2$ whose primary particles have an average particle size of 1 μm as a nickel-sodium-containing composite oxide.

Then, the resulting $NaNiO_2$ was added in $LiNO_3$ melted at 300° C., followed by a reaction in a dry air atmosphere at a dew point of −10° C. for 3 hours. At this time, the amount of $LiNO_3$ was 20 equivalents to $NaNiO_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of $LiNO_3$ melted at 300° C. for 3 hours, cooled, ground, washed with ion-exchange water and suction-filtered to obtain a positive electrode active material Z composed of a nickel-lithium-containing composite oxide.

The positive electrode active material Z specified by ICP analysis had a composition of $LiNiO_2$. A macrophotograph taken under SEM of the positive electrode active material Z was observed. As a result, particles converted into primary particles having an average particle size of about 1 μm were observed and also it was confirmed that cracks having a width of several to several tens of nanometers exist densely on the surface of the particles.

In the same manner as in Example 1, except that the positive electrode active material Z was used in place of the positive electrode active material A, a battery was produced. The resulting battery is referred to as the battery of Example 23.

Example 24

NiO was classified to obtain NiO having a secondary particle size of about 5 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 600° C. for 12 hours to obtain $NaNiO_2$ whose primary particles have an average particle size of 1 μm as a nickel-sodium-containing composite oxide.

Then, the resulting $NaNiO_2$ was added in $LiNO_3$ melted at 300° C., followed by a reaction in a dry air atmosphere at a dew point of −30° C. for 3 hours. At this time, the amount of $LiNO_3$ was 20 equivalents to $NaNiO_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of $LiNO_3$ melted at 300° C. for 3 hours, cooled, ground, washed with ion-exchange water and suction-filtered to obtain a positive electrode active material α composed of a nickel-lithium-containing composite oxide.

The positive electrode active material α specified by ICP analysis had a composition of $LiNiO_2$. A macrophotograph taken under SEM of the positive electrode active material α was observed. As a result, particles converted into primary particles having an average particle size of about 1 μm were observed and also it was confirmed that cracks having a width of several to several tens of nanometers exist densely on the surface of the particles.

In the same manner as in Example 1, except that the positive electrode active material α was used in place of the positive electrode active material A, a battery was produced. The resulting battery is referred to as the battery of Example 24.

Example 25

The positive electrode active material A obtained by the same manner as in Example 1 was formed into a pellet and then subjected to a heat treatment at 750° C. for 5 hours. Then, the pellet was ground to prepare a positive electrode active material β.

The positive electrode active material β specified by ICP analysis had a composition of $LiNiO_2$. A macrophotograph taken under SEM of the positive electrode active material β was observed. As a result, it was confirmed that primary particles having an average particle size of about 1 μm form secondary particles having an average particle size of about 20 to 30 μm and cracks having a width of several to several tens of nanometers exist densely on the surface of the particles.

In the same manner as in Example 1, except that the positive electrode active material β was used in place of the positive electrode active material A, a battery was produced. The resulting battery is referred to as the battery of Example 25.

Example 26

NiO was classified to obtain NiO having a secondary particle size of about 5 μm. To 3.738 g (50 mmol) of the resulting NiO, 0.5 equivalents of $Na_2O_2$ and 0.06 equivalents of $LiOH.H_2O$ were added, followed by sufficient mixing in an agate mortar. Then, the resulting mixture was reacted in an oxygen atmosphere at 600° C. for 12 hours to obtain $Li_{0.06}Na_{0.94}NiO_2$ whose primary particles have an average particle size of 1 μm as a nickel-sodium-containing composite oxide.

Then, the resulting $Li_{0.06}Na_{0.94}NiO_2$ was added in $LiNO_3$ melted at 300° C., followed by a reaction in a dry air atmosphere at a dew point of −40° C. for 3 hours. At this time, the amount of $LiNO_3$ was 20 equivalents to $Li_{0.06}Na_{0.94}NiO_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of $LiNO_3$ melted at 300° C. for 3 hours, cooled, ground, washed with ion-exchange water and suction-filtered to obtain a positive electrode active material γ composed of a nickel-lithium-containing composite oxide.

The positive electrode active material γ specified by ICP analysis had a composition of $LiNiO_2$. A macrophotograph taken under SEM of positive electrode active material γ was observed. As a result, particles converted into primary particles having an average particle size of about 1 μm were observed and also it was confirmed that cracks having a width of several to several tens of nanometers exist densely on the surface of the particles.

In the same manner as in Example 1, except that the positive electrode active material γ was used in place of the positive electrode active material A, a battery was produced. The resulting battery is referred to as the battery of Example 26.

Example 27

NiO was classified to obtain NiO having a secondary particle size of about 5 μm. To 3.738 g (50 mmol) of the resulting NiO, 0.525 equivalents of $Na_2O_2$ was added, followed by sufficient mixing in an agate mortar. Then, the resulting mixture was reacted in an oxygen atmosphere at 700° C. for 5 hours to obtain $Na_{0.93}NiO_2$ whose primary particles have an average particle size of 10 μm as a nickel-sodium-containing composite oxide.

Then, the resulting $Na_{0.93}NiO_2$ was added in $LiNO_3$ melted at 300° C., followed by a reaction in a dry air atmosphere at a dew point of −40° C. for 3 hours. At this time, the amount of $LiNO_3$ was 20 equivalents to $Na_{0.93}NiO_2$. The reaction product was cooled to room temperature and then ground in an agate mortar. To the product, 20 mL of ion-exchange water was added, followed by sufficient stirring and further suction filtration to obtain a powder. The resulting powder was reacted again in 20 equivalents of $LiNO_3$ melted at 300° C. for 3 hours, cooled, ground, washed with ion-exchange water and suction-filtered to obtain a positive electrode active material δ composed of a nickel-lithium-containing composite oxide.

The positive electrode active material δ specified by ICP analysis had a composition of $Li_{0.93}NiO_2$. A macrophotograph taken under SEM of the positive electrode active material δ was observed. As a result, particles converted into primary particles having an average particle size of about 8 to 10 μm were observed and also it was confirmed that cracks having a width of several to several tens of nanometers exist densely on the surface of the particles.

In the same manner as in Example 1, except that the positive electrode active material δ was used in place of the positive electrode active material A, a battery was produced. The resulting battery is referred to as the battery of Example 27.

(Evaluation)

With respect to the batteries of Examples 21 to 27, charging and discharging were repeated under the conditions of an environmental temperature of 25° C., a constant current (12 mA) of one hour-rate, a voltage range from an upper limit voltage of 4.2 V to a lower limit voltage of 3.0 V. The value obtained by standardizing the discharge capacity of the 1st cycle and the discharge capacity of the 50th cycle per unit mass of a positive electrode active material, and the ratio of the discharge capacity of the 50th cycle to the discharge capacity of the 1st cycle are shown in Table 3.

TABLE 3

| Battery | Discharge capacity (A) of the 1st cycle (mAh/g) | Discharge capacity (B) of the 50th cycle (mAh/g) | (B)/(A) |
| --- | --- | --- | --- |
| Example 21 | 187 | 153 | 0.818 |
| Example 22 | 191 | 157 | 0.822 |
| Example 23 | 168 | 136 | 0.810 |
| Example 24 | 173 | 141 | 0.815 |
| Example 25 | 155 | 134 | 0.865 |
| Example 26 | 211 | 174 | 0.825 |
| Example 27 | 134 | 101 | 0.754 |

All batteries of Examples 21 to 27 exhibited excellent charging and discharging cycle lifetime characteristics, namely, the ratio (B)/(A) exceeds 0.75

The battery of Example 25 in which once synthesized positive electrode active material was subjected again to a heat treatment, exhibited a discharge capacity of the 1st cycle of 155 mAh/g, which is lower than 201 mAh/g of the battery of Example 1 which was not subjected to a heat treatment. The reason is considered that particles were converted into secondary particles, and thus ionic diffusion at the grain boundary was suppressed and discharge characteristics deteriorated.

In contrast, the battery of Example 27 in which the reaction with $Na_2O_2$ was performed at 700° C. exhibited a slightly low ratio (B)/(A) of 0.754. The reason is that the temperature of the reaction with $Na_2O_2$ was high, and thus a sodium compound volatilized during the reaction and the amount of lithium ions in the positive electrode active material δ after the ion exchange reaction with lithium became too small.

In the batteries of Examples 23 and 24 in which the reaction with the molten salt containing lithium was performed at a dew point of −10° C. and −30° C., respectively, the capacity decreased as compared with the battery of Example 1. The reason is considered that the dew point temperature was higher than that of Example 1, and thus the surface of $NaNiO_2$ as an active material precursor was modified as a result of an attack by humidity, resulting in deterioration of discharge characteristics.

One aspect of the present invention described in detail above pertains to a positive electrode active material for a non-aqueous electrolyte secondary battery, comprising a nickel-alkali metal-containing composite oxide having cracks on the surface of primary particles. Such a positive electrode active material can suppress expanding and shrinkage of the entire particles because volume variation upon charging and discharging is relieved by cracks. Therefore, it is possible to obtain a high capacity non-aqueous electrolyte secondary battery in which the capacity does not remarkably decrease even if the number of charging and discharging cycles increases.

Also, the composition of the nickel-alkali metal-containing composite oxide is preferably represented by the following general formula (1):

$$Li_{w-x}Na_xNi_{1-y-z}Mn_yMe_zO_2 \quad (1)$$

wherein, in the formula (1), w satisfies the following relation: 0.9≦w≦1.1, x satisfies the following relation: 0≦x≦0.05, y satisfies the following relation: 0≦y≦0.34, z satisfies the following relation: 0≦z≦0.34, and Me represents at least one element selected from the group consisting of Co, Fe, Cu, Al, Mg, Ti, Zr, Ce and Y.

Also, when the average particle size of the primary particles is from 1 to 50 μm, a positive electrode active material can be filled on an electrode plate in a high density and also adhesion between the positive electrode active materials can be sufficiently maintained.

Also, it is preferred that the nickel-alkali metal-containing composite oxide doe not substantially form secondary particles. When it exists as primary particles, lubricity between the positive electrode active materials is improved and thus the filling amount per unit volume can increase.

Also, another aspect of the present invention pertains to a method for producing a positive electrode active material for a non-aqueous electrolyte secondary battery, which comprises a step of performing an ion-exchange reaction of sodium and lithium by mixing a nickel-sodium-containing composite oxide whose primary particles has an average particle size of from 1 to 50 μm with a molten salt containing lithium. According to the method, in the case where sodium in the nickel-sodium-containing composite oxide is substituted with lithium, particles shrink due to a difference in the ionic radius between sodium and lithium. Also, cracks are easily formed on the surface of primary particles so as to relieve distortion generated by shrinkage.

Also, the ion-exchange reaction of the nickel-sodium-containing composite oxide and the molten salt containing lithium is preferably performed in an atmosphere at a dew point of −40° C. or lower in view of the fact that the capacity of the positive electrode active material can be enhanced by suppressing production of a hydroxide as a by-product.

Also, the molten salt is preferably added in an amount which is at least 5 times larger than that of the nickel-sodium-containing composite oxide, in terms of a stoichiometric amount of lithium, in view of the fact that a high capacity can be maintained by sufficient proceeding of the ion exchange reaction of sodium and lithium.

Also, the ion-exchange reaction is preferably performed multiple times in view of sufficient proceeding of the ion exchange reaction of sodium and lithium.

Also, the nickel-sodium-containing composite oxide is preferably obtained by mixing an oxygen-containing nickel compound whose secondary particles have an average particle size of 1 to 50 μm with an alkali metal source containing sodium and maintaining the mixture at the temperature of the melting point or higher of the alkali metal source.

Also, the temperature of the melting point or higher of the alkali metal source is preferably maintained at a temperature of 650° C. or lower in view of that fact that the composition can be precisely controlled by suppressing volatilization of the alkali metal source.

Also, it is preferred to use the alkali metal source in an amount larger than a stoichiometric amount based on the oxygen-containing nickel compound because the stoichiometric ratio of the product is less likely to shift.

Another aspect of the present invention pertains to a non-aqueous electrolyte secondary battery comprising a battery case, and an electrode plate group and a non-aqueous electrolyte, which are sealed into the battery case, the electrode plate group including the positive electrode plate containing the positive electrode active material and a negative electrode plate, which face each other with a separator being interposed therebetween. Such a non-aqueous electrolyte secondary battery has high capacity and long lifetime in which the capacity does not remarkably decrease even if the number of a charging and discharging cycle increases.

This application is based on patent application nos. 2006-316185 and 2006-329798 filed in Japan, the contents of which are hereby incorporated by reference.

Although the present invention has been fully described by way of example, it is to be understood that various changes and modifications will be apparent to those skilled in the art. Therefore, unless otherwise such changes and modifications depart from the scope of the present invention hereinafter defined, they should be construed as being included therein.

What is claimed is:

1. A positive electrode active material for a non-aqueous electrolyte secondary battery, comprising a nickel-alkali metal-containing composite oxide having cracks on the surface of primary particles, wherein the composition of the nickel-alkali metal-containing composite oxide is represented by the following general formula (I):

$$Li_{w-x}Na_xNi_{1-y-z}Mn_yMe_zO_2 \tag{1}$$

wherein, in the formula (I), w satisfies the following relation: $0.9 \leq w \leq 1.1$, x satisfies the following relation: $0 < x \leq 0.05$, y satisfies the following relation: $0 = y$, z satisfies the following relation: $0 < z \leq 0.34$, and Me represents Al, and wherein the primary particles have an average particle size of from 1 to 50 μm.

2. The positive electrode active material for a non-aqueous electrolyte secondary battery according to claim 1, wherein the nickel-alkali metal-containing composite oxide does not form secondary particles.

3. A non-aqueous electrolyte secondary battery comprising a battery case, and an electrode plate group and a non-aqueous electrolyte, which are sealed into the battery case, the electrode plate group including a positive electrode plate containing the positive electrode active material according to claim 1 and a negative electrode plate, which face each other with a separator being interposed therebetween.

* * * * *